(12) United States Patent
Zhou

(10) Patent No.: US 12,469,198 B2
(45) Date of Patent: Nov. 11, 2025

(54) VIRTUAL OBJECT DISPLAY METHOD AND APPARATUS, ELECTRONIC DEVICE, AND MEDIUM

(71) Applicant: BEIJING BYTEDANCE NETWORK TECHNOLOGY CO., LTD., Beijing (CN)

(72) Inventor: Shiwen Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 18/253,111

(22) PCT Filed: Nov. 19, 2021

(86) PCT No.: PCT/CN2021/131611
§ 371 (c)(1),
(2) Date: May 16, 2023

(87) PCT Pub. No.: WO2022/105846
PCT Pub. Date: May 27, 2022

(65) Prior Publication Data
US 2023/0419582 A1    Dec. 28, 2023

(30) Foreign Application Priority Data

Nov. 20, 2020   (CN) .......................... 202011313637.8

(51) Int. Cl.
*G06T 13/40* (2011.01)
*G06T 7/70* (2017.01)
(Continued)

(52) U.S. Cl.
CPC ................ *G06T 13/40* (2013.01); *G06T 7/70* (2017.01); *G06T 17/00* (2013.01); *G06V 40/168* (2022.01)

(58) Field of Classification Search
CPC .... G06F 3/012; G06F 1/1686; G06F 3/04845; G06F 3/0304; G06F 3/011; G06F 3/0488;
(Continued)

(56) References Cited

U.S. PATENT DOCUMENTS

2013/0346588 A1   12/2013  Zhang et al.
2017/0046065 A1*   2/2017  Zeng ........................ G06F 3/012
(Continued)

FOREIGN PATENT DOCUMENTS

CN   106993195 A    7/2017
CN   108829893 A   11/2018
(Continued)

OTHER PUBLICATIONS

International Search Report (with English translation) and Written Opinion issued in PCT/CN2021/131611, dated Feb. 15, 2022, 13 pages provided.

(Continued)

*Primary Examiner* — Xilin Guo
(74) *Attorney, Agent, or Firm* — Astute IP Law Group

(57) ABSTRACT

A virtual object display method and apparatus, an electronic device, and a medium are provided. The method includes: displaying an object model of a virtual object and at least one preset control, where each preset control is used for indicating a control mode; when a first trigger operation performed on a first preset control among the preset controls is detected, displaying the first preset control as a first display state, where the first display state is used for indicating that a control mode indicated by the corresponding preset control is in an on state; when the first control mode indicated by the first preset control is in an on state, receiving first control information for a target part in the
(Continued)

virtual object; and replacing the part model of the target part with a target model corresponding to the first control information.

19 Claims, 13 Drawing Sheets

(51) Int. Cl.
  *G06T 17/00* (2006.01)
  *G06V 40/16* (2022.01)
(58) Field of Classification Search
  CPC ....... G06F 3/04883; G06T 7/70; G06T 13/40; G06T 17/00; G06T 19/20; G06V 10/761; G06V 20/20; G06V 40/161; G06V 40/103; G06V 40/168; G06V 40/20; G06V 40/11; G06V 40/00
  See application file for complete search history.

(56) References Cited

U.S. PATENT DOCUMENTS

| | | | |
|---|---|---|---|
| 2021/0312167 A1* | 10/2021 | Shirai | G10L 15/22 |
| 2022/0091722 A1* | 3/2022 | Faulkner | G06F 3/0485 |

FOREIGN PATENT DOCUMENTS

| | | |
|---|---|---|
| CN | 108958475 A | 12/2018 |
| CN | 109271553 A | 1/2019 |
| CN | 110650354 A | 1/2020 |
| CN | 110850983 A | 2/2020 |
| CN | 110991327 A | 4/2020 |
| CN | 111083509 A | 4/2020 |
| CN | 111353071 A | 6/2020 |
| CN | 111420399 A | 7/2020 |
| CN | 111862280 A | 10/2020 |
| CN | 112199526 A | 1/2021 |
| CN | 112396679 A | 2/2021 |
| WO | 2017029679 A1 | 2/2017 |

OTHER PUBLICATIONS

Anonymous, "How to Use Control Center in iOS 12 for Quick Settings", https://www.i4.cn/news_detail_24174.html, Sep. 26, 2018, cited in ISR; with English translation.
International Search Report and Written Opinion for PCT/CN2021/117199, mailed on Dec. 17, 2021, 14 pages.

* cited by examiner

VIRTUAL OBJECT DISPLAY METHOD AND APPARATUS, ELECTRONIC DEVICE, AND MEDIUM

This application is the national phase of International Application No. PCT/CN2021/131611 filed on Nov. 19, 2021, which claims priority to Chinese Patent Application No. 202011313637.8, titled "VIRTUAL OBJECT DISPLAY METHOD AND APPARATUS, ELECTRONIC DEVICE, AND MEDIUM", filed on Nov. 20, 2020 with the China National Intellectual Property Administration, both of which are incorporated herein by reference in their entireties.

FIELD

The present disclosure relates to the field of multimedia technology, and in particular, to a method and apparatus for displaying a virtual object, an electronic device, and a medium.

BACKGROUND

With the rapid development of computer technology and mobile communication technology, especially multimedia technology, various entertainment platforms based on electronic devices are widely used, which greatly enriches people's daily life.

At present, in order to increase the fun, various entertainment platforms propose a function of virtual image generation, so that a user can generate a virtual image and use the virtual image for entertainment interaction in the entertainment platforms.

However, in the related art, the user cannot flexibly control the virtual image according to his own needs, and the expected fun cannot be achieved, resulting in lowered user experience.

SUMMARY

In order to solve or at least partially solve the above technical problems, a method and apparatus for displaying a virtual object, an electronic device, and a medium are provided according to the present disclosure.

In a first aspect, a method for displaying a virtual object is provided according to the present disclosure. The method includes:
  displaying an object model of the virtual object and at least one preset control, where the object model includes part models of parts of the virtual object, and each of the at least one preset control is used to indicate a control mode;
  in response to detecting a first trigger operation performed on a first preset control in the at least one preset control, displaying the first preset control in a first display state, where the first display state is used to indicate a control mode indicated by a corresponding preset control being in an ON state;
  in a case that a first control mode indicated by the first preset control is in the ON state, receiving first control information targeted for a target part of the virtual object; and
  replacing a part model of the target part with a target model corresponding to the first control information for display.

In a second aspect, an apparatus for displaying a virtual object is provided according to the present disclosure. The apparatus includes a first display unit, a second display unit, a first receiving unit, and a third display unit.

The first display unit is configured to display an object model of the virtual object and at least one preset control, where the object model includes part models of parts of the virtual object, and each of the at least one preset control is used to indicate a control mode.

The second display unit is configured to: in response to detecting a first trigger operation performed on a first preset control in the at least one preset control, display the first preset control in a first display state, where the first display state is used to indicate a control mode indicated by a corresponding preset control being in the ON state.

The first receiving unit is configured to: in a case that a first control mode indicated by the first preset control is in the ON state, receive first control information targeted for a target part of the virtual object.

The third display unit is configured to replace a part model of the target part with a target model corresponding to the first control information for display.

In a third aspect, an electric device is provided according to the present disclosure. The electric device includes:
  a processor; and
  a memory configured to store executable instructions;
    where the processor is configured to read the executable instructions from the memory, and execute the executable instructions to implement the method for displaying a virtual object according to the first aspect.

In a fourth aspect, a computer-readable storage medium having a computer program stored thereon is provided according to the present disclosure. The computer program, when being executed by a processor, causes the processor to implement the method for displaying a virtual object according to the first aspect.

Compared with the conventional technology, the technical solutions according to the embodiments of the present disclosure have at least the following advantages.

With the method and apparatus for displaying a virtual object, the electronic device, and the medium according to the embodiments of the present disclosure, at least one preset control can be displayed, so that the user can select a desired control mode from control modes indicated by the at least one preset control. In a case that the first trigger operation performed by the user on the first preset control corresponding to the selected control mode is detected, the first preset control can be displayed in the first display state, and the first control mode indicated by the first preset control can be controlled to be in the ON state, so that the first control information targeted for the target part of the virtual object can be received in a case that the first control mode is in the ON state, and the part model of the target part is replaced with the target model corresponding to the first control information for display. In this way, personalized adjustment can be performed on the object model of the virtual object based on the first control information, so that the user can flexibly control the virtual object according to his own needs, thereby improving the user experience.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the originals and elements are not necessarily drawn to scale.

DETAILED DESCRIPTION OF EMBODIMENTS

Figure 1:
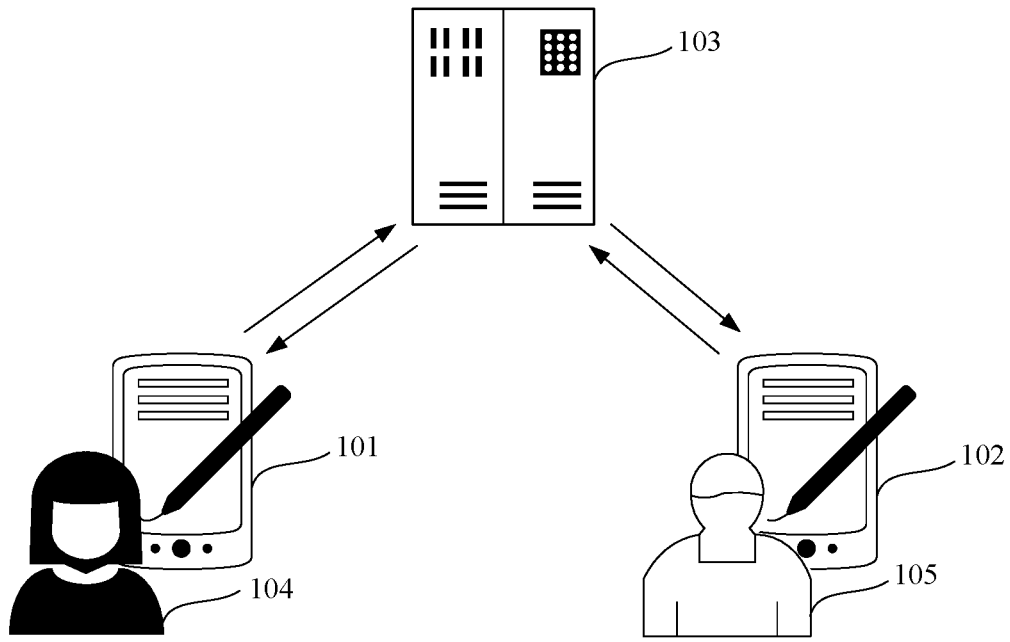
FIG. 1 shows an architecture for performing a method for displaying a virtual object according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

The method for displaying a virtual object according to the present disclosure may be applied to an architecture shown in FIG. 1, and will be described in detail with reference to FIG. 1.

FIG. 1 shows architecture for performing a method for displaying a virtual object according to an embodiment of the present disclosure.

As shown in FIG. 1, at least one first electronic device 101, at least one second electronic device 102, and at least one server 103 may be included in the architecture diagram. A first client runs on the first electronic device 101, a second client runs on the second electronic device, and a server runs on the server 103. The first electronic device 101 and the second electronic device 102 may establish a connection with the server 103 and perform information exchange with the server 103 through a network protocol such as Hyper Text Transfer Protocol over Secure Socket Layer (HTTPS). The first electronic device 101 and the second electronic device 102 each may include a mobile phone, a tablet computer, a desktop computer, a notebook computer, a vehicle-mounted terminal, a wearable device, an all-in-one computer, a smart home device and other devices with communication functions, or a device that is simulated by a virtual machine or an emulator. The server 103 may be a device with storage and computing functions, such as a cloud server or a server cluster.

Based on the above architecture, video recording is illustrated as an example. A first user 104 using the first electronic device 101 may record a video in a predetermined platform on the first electronic device 101. A second user 105 using the second electronic device 102 may watch the video recorded by the first user 104 in the predetermined platform on the second electronic device 102. The server 103 may receive the video recorded by the first electronic device 101, and send the received video to the second electronic device 102 that needs to play the video.

When the first user 104 records the video, the first user 104 may generate a virtual image similar to his own image in the predetermined platform, and use the virtual image to enhance the fun of the recorded video and enhance the user experience.

Taking the case that the predetermined platform is a live streaming platform as an example, the live streaming platform may be a live streaming application or a live streaming website. The first user 104 may record live video in the live streaming platform on the first electronic device 101, and the second user 105 may enter, in the live streaming platform on the second electronic device 102, a live streaming room of the first user 104 to watch the live video. The server 103 may receive the live video recorded by the first electronic device 101 and send the received live video to the second electronic device 102 entering the live streaming room of the first user 104. In a case that the first user 104 wants to improve the fun of the live video, the first user 104 may generate a virtual image corresponding to his own image in the live streaming platform, and use the virtual image as a virtual host to perform live streaming.

In addition, taking the case that the predetermined platform is a short video platform as an example, the short video platform may be a short video application or a short video website. The first user 104 may record a short video in the short video platform on the first electronic device 101. The second user 105 may watch the short video recorded by the first user 104 in the short video platform on the second electronic device 102. The server 103 may receive the short video recorded by the first electronic device 101 and send the received short video to the second electronic device 102 that requests to play the short video recorded by the first user 104. In a case that the first user 104 wants to improve the fun of the short video, the first user 104 may generate a virtual image corresponding to his own image on the short video platform, and use the virtual image as a protagonist of the video.

Based on the above architecture, game interaction may be illustrated as an example. The first user 104 using the first electronic device 101 and the second user 105 using the second electronic device 102 each may generate a virtual image that is similar to his own image in a predetermined platform on his electronic device, and perform game interactions with the virtual image, such as taking pictures and sharing virtual images.

In the embodiment of the present disclosure, in order to further improve the user experience, the user's requirement for personalized virtual image may be satisfied. Here, the first user 104 controlling the virtual image through the first electronic device 101 is illustrated as an example. At least one preset control may be displayed on the first electronic device 101, so that the first user 104 may select a desired control mode from control modes indicated by the at least one preset control. In a case that a first trigger operation performed on a first preset control corresponding to the control mode selected by the first user 104 is detected, the first preset control may be displayed in a first display state, and a first control mode indicated by the first preset control is controlled to be in ON state. Once the first control mode is in ON state, first control information regarding control performed by the first user 104 for a target part of a virtual object in a predetermined virtual image may be received, and a part model of the target part is replaced with a target model corresponding to the first control information. In this way, personalized adjustment can be performed on the object model of the virtual object based on the first control information, so that the user can flexibly control the virtual object in the predetermined virtual image as needed, thereby improving the user experience.

Further, the first electronic device 101 may record the process of the first user 104 controlling the virtual object into a video, or use the virtual object obtained by the first user 104 to record a video, and send the recorded video including the virtual object to the server 103. The server 103 may send the received video including the virtual object to an electronic device requesting the video for playing, thereby improving the fun of the video.

Based on the above architecture, the method for displaying a virtual object according to the embodiments of the present disclosure will be described below with reference to FIG. 2 to FIG. 13. In an embodiment of the present disclosure, the method for displaying a virtual object may be performed by an electronic device. In some embodiments, the electronic device may be the first electronic device 101 shown in FIG. 1. In other embodiments, the electronic device may be the second electronic device 102 shown in FIG. 1, which is not limited herein. The electronic device may be a mobile phone, a tablet computer, a desktop computer, a notebook computer, a vehicle-mounted terminal, a wearable device, an all-in-one computer, a smart home device and other devices with communication functions, or a device that is simulated by a virtual machine or an emulator.

Figure 2:
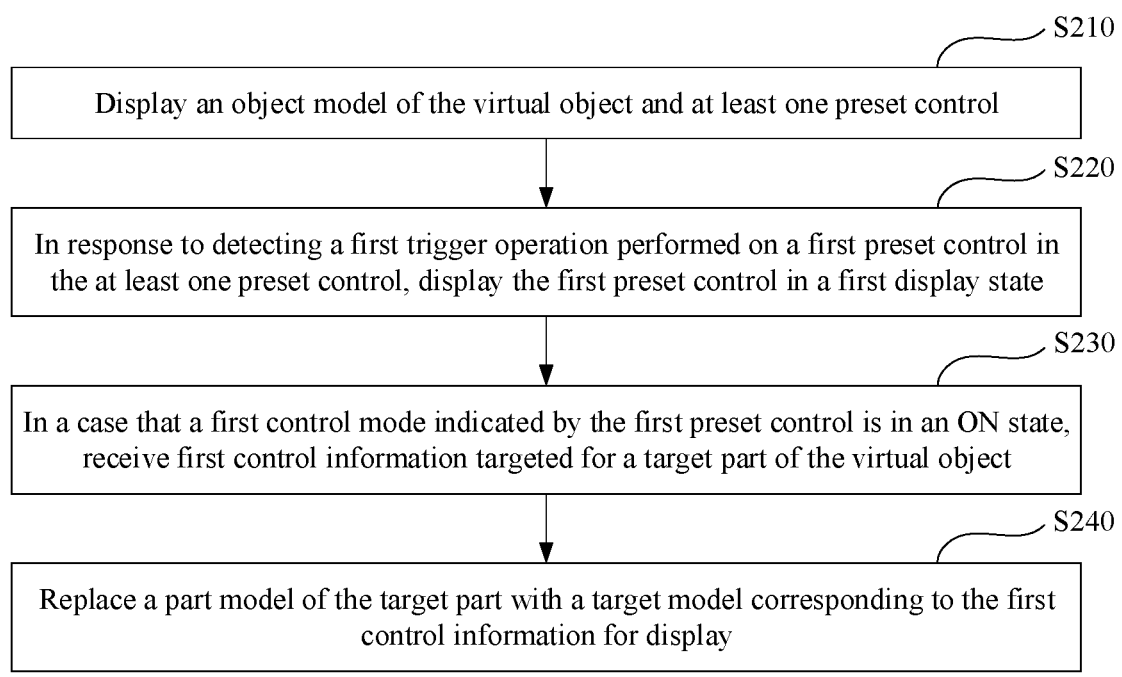
FIG. 2 is a schematic flowchart of a method for displaying a virtual object according to an embodiment of the present disclosure.

FIG. 2 shows a schematic flowchart of a method for displaying a virtual object according to an embodiment of the present disclosure.

As shown in FIG. 2, the method for displaying a virtual object may include steps S210 to S240.

In S210, an object model of the virtual object and at least one preset control are displayed.

Specifically, a virtual object interaction page may be displayed on an electronic device, and the object model of the virtual object and the at least one preset control are displayed on the virtual object interaction page.

In an embodiment of the present disclosure, the virtual object may include an object having a virtual image. The virtual image may include at least one of a virtual human image and a virtual cartoon image. Optionally, the virtual cartoon image may be specifically a virtual anthropomorphic cartoon image.

Further, the virtual human image may be a two-dimensional virtual human image or a three-dimensional virtual human image. The virtual cartoon image may be a two-dimensional virtual cartoon image or a three-dimensional virtual cartoon image.

In some embodiments, the virtual object may serve as a virtual host during the process that the user records the live video. In other embodiments, during the process that the user records a short video, the virtual object may serve as a target subject in the short video. In still other embodiments, in the process that the user performs game interaction using the virtual image, the virtual object may serve as a protagonist of the game. The application scenarios of the virtual image are not limited in the present disclosure.

In an embodiment of the present disclosure, the object model of the virtual object may include part models of parts of the virtual object.

Optionally, the parts of the virtual object may include parts at different granularities. For example, the parts of the virtual object may include parts at large granularity, such as head and shoulders, upper body, and lower body. For another example, the parts of the virtual object may include parts at coarse granularity, such as a head, an arm, a torso, and a leg. For another example, the parts of the virtual object may include parts at medium granularity, such as facial features, hairstyle, cheeks, hands, feet, elbows, knees, neck, shoulders, and waist. For another example, the parts of the virtual object may include parts at fine granularity, such as pupils, eyebrows, eyelids, and fingers.

The part models of the parts at fine granularity may be combined into part models of the parts at medium granularity, and the part models of the parts at medium granularity may be combined into part models of the parts at coarse granularity. The part models of the parts at coarse granularity may be combined into part models of the parts at large granularity.

It should be noted that, alternatively, the parts of the virtual object may be parts at other granularities, as long as the requirements of the corresponding control mode and control information can be met, which is not limited herein.

In an embodiment of the present disclosure, each of the at least one preset control may be used to indicate a control mode. For example, a first preset control may be used to indicate a first control mode, and a second preset control may be used to indicate a second control mode. In each of the control modes, a control operation corresponding to the control mode may be performed on the virtual object.

Optionally, the preset control may be a control for enabling the indicated control mode, and the indicated control mode may be enabled based on the preset control. For example, the preset control can be a switch control. For another example, the preset control may also be a check control, which is not limited herein.

In an embodiment of the present disclosure, the object model may be displayed at any position on the virtual object interaction page, which is not limited herein. At least one preset control may be displayed at any position on the virtual object interaction page, which is not limited herein.

Hereinafter, the embodiment of the present disclosure will be further illustrated by taking the case in which the preset control is a switch control as an example.

Figure 3:
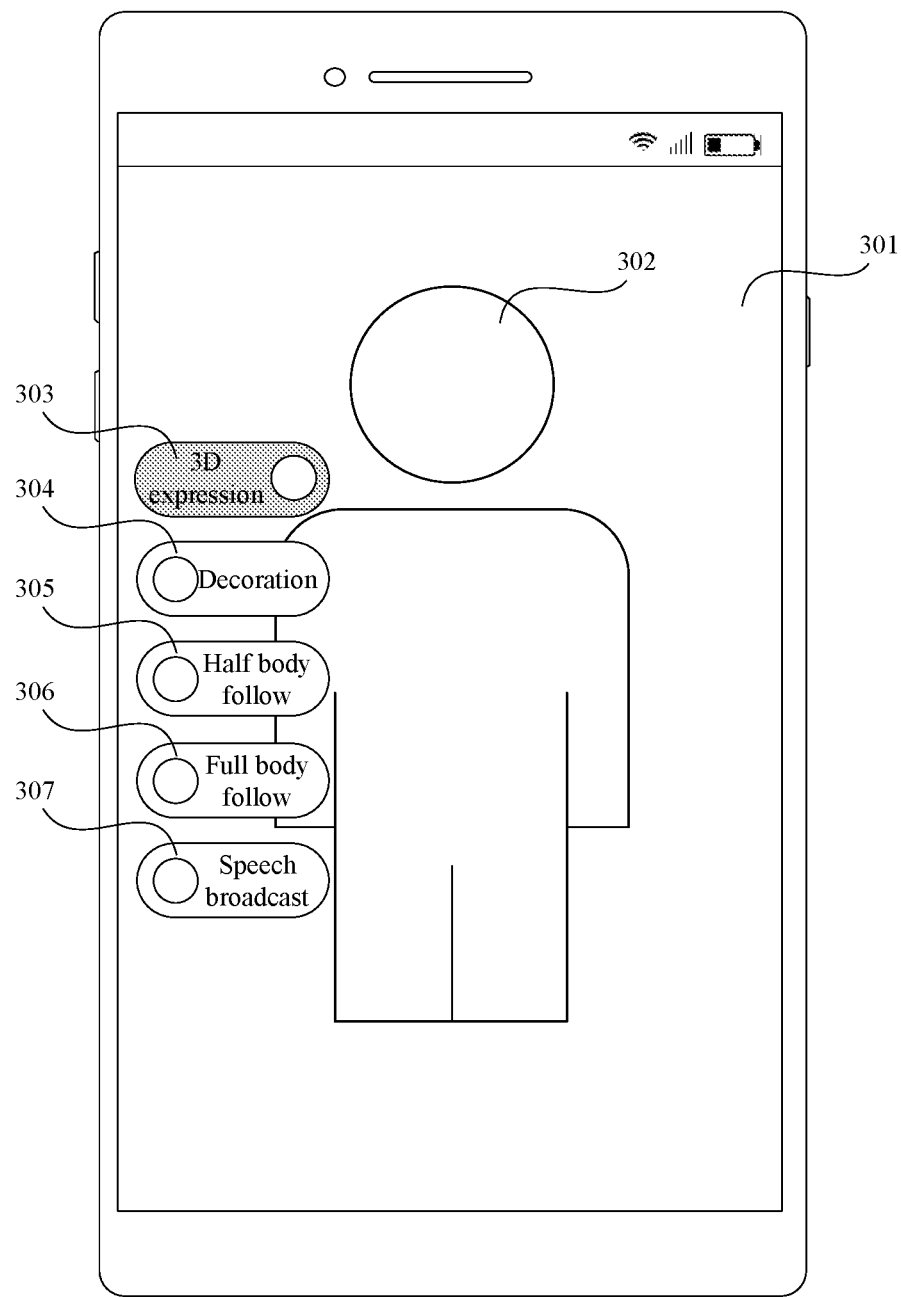
FIG. 3 is a schematic diagram of a virtual object interaction page according to an embodiment of the present disclosure.

FIG. 3 shows a schematic diagram of a virtual object interaction page according to an embodiment of the present disclosure. As shown in FIG. 3, a virtual object interaction page 301 is displayed on the electronic device, and an object model 302 of the virtual object and five switch controls are displayed on the virtual object interaction page 301. The object model 302 may be located in the middle of the virtual object interaction page 301, and the five switch controls may be displayed on a left side of the virtual object interaction page 301. The five switch controls may include a "three-dimensional (3D) expression" switch 303, a "decoration" switch 304, a "half body follow" switch 305, a "full body follow" switch 306 and a "speech broadcast" switch 307.

The "3D expression" switch 303 may indicate a 3D expression mode, in which a head model of the virtual object is always maintained as a model with a preset 3D expression, that is, a facial expression of the virtual object is always maintained as the preset 3D expression.

The "decoration" switch 304 may indicate a decoration mode, in which the user may decorate the object model of the virtual object according to his own preferences.

The "half body follow" switch 305 may indicate a half body follow mode, in which a model posture of a upper half limb model of the virtual object may be changed as the user posture changes.

The "whole body follow" switch 306 may indicate a whole body follow mode, in which a model posture of all limb models of the virtual object may be changed as the user posture changes.

The "speech broadcast" switch 307 may indicate a speech broadcast mode, in which the virtual object may perform a speech broadcast based on the text input by the user.

In S220, in response to detecting a first trigger operation performed on a first preset control in the at least one preset control, the first preset control is displayed in a first display state.

In an embodiment of the present disclosure, in response to detecting the first trigger operation performed on the first preset control in the preset controls, the electronic device may acquire first control information targeted for the virtual object in a first control mode indicated by the first preset control. Specifically, in response to detecting the first trigger operation performed on the first preset control in the at least one preset control, the first preset control is displayed in the first display state, where the first display state is used to indicate a control mode indicated by the corresponding preset control being in the ON state. In a case that the first control mode indicated by the first preset control is in the ON state, the first control information targeted for a target part of the virtual object is obtained.

In some embodiments of the present disclosure, the preset control may be displayed in the first display state and a second display state.

The first display state may be used to indicate the control mode indicated by a corresponding preset control being in the ON state, that is, in a case that any preset control is displayed in the first display state, the control mode indicated by the preset control is in the ON state. The second display state may be used to indicate the control mode indicated by a corresponding preset control being in an OFF state, that is, in a case that any preset control is displayed in the second display state, the control mode indicated by the preset control is in the OFF state.

Taking the preset control being a switch control as an example, the first display state may be an on display state, and the second display state may be an off display state. Continuing to refer to FIG. 3, the "3D expression" switch 303 is displayed in the ON display state, and therefore, the 3D expression mode is in the ON state.

Taking the preset control being a check control as an example, the first display state may be a display state indicating being selected, and the second display state may be a display state indicating being unselected.

In the embodiment of the present disclosure, the first preset control may be any preset control selected by the user, that is, a preset control indicating a control mode required by the user.

Optionally, the first trigger operation may be a trigger operation performed by the user on a preset control displayed in the second display state, and may be used to switch the display of the first preset control from the second display state to the first display state.

Specifically, during the process of displaying the preset control on the electronic device, the user may select a preset control displayed in the second display state as the first preset control at any time as required, and perform the first trigger operation on the preset control. The electronic device may continuously detect the trigger operation performed by the user on the preset control, and in a case that the first trigger operation performed by the user on the first preset control displayed in the second display state is detected, control the first control mode indicated by the first preset control to be in the ON state, and switch the display of the first preset control from the second display state to the first display state.

Taking the preset control being a switch control as an example, the first trigger operation may be a trigger operation, such as a click operation, a double-click operation, a long-press operation, a voice control operation or an expression control operation, performed on a switch control displayed in the OFF display state. In the process of displaying the switch control on the electronic device, the user may select the switch control displayed in the OFF display state as the first switch control at any time as required, and perform the first trigger operation on the switch control. The electronic device may continuously detect the trigger operation performed by the user on the switch control, and in a case that the first trigger operation performed by the user on any first switch control displayed in the OFF display state is detected, control the first control mode indicated by the first switch control to be the ON state, and display the first switch control in the ON display state.

Continuing to refer to FIG. 3, if the user wants to enable the decoration mode, the user may click on the "decoration" switch 304 (not shown).

Figure 4:
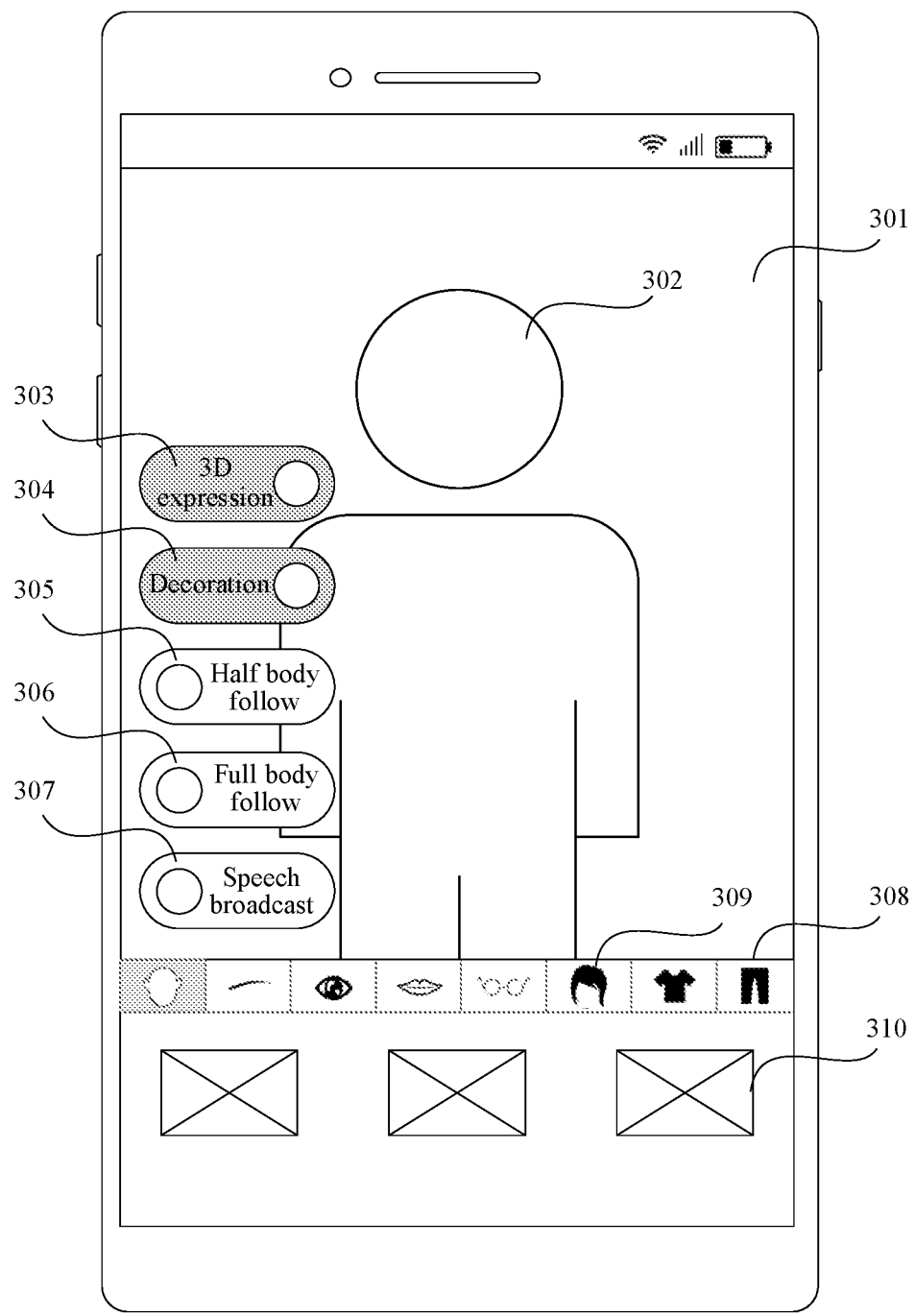
FIG. 4 is a schematic diagram of a virtual object interaction page according to another embodiment of the present disclosure.

FIG. 4 shows a schematic diagram of a virtual object interaction page according to another embodiment of the present disclosure. As shown in FIG. 4, after the user clicks the "decoration" switch 304, the electronic device may enable the decoration mode, so that the decoration mode is in the ON state, and the display of the "decoration" switch 304 is switched from the OFF display state to the ON display state.

Taking the preset control being a check control as an example, the first trigger operation may be a trigger operation, such as a click operation, a double-click operation, a long-press operation, a voice control operation or an expression control operation, performed on a check control displayed in a display state indicating being unselected. During the process of displaying the check control on the electronic device, the user may select the check control displayed in the display state indicating being unselected as the first check control at any time as required, and perform the first trigger operation on the check control. The electronic device may continuously detect the trigger operation performed by the user on the check control, and in response to detecting the first trigger operation performed by the user on any first check control displayed in the display state indicating being unselected, control the first check control mode indicated by the first check control to be in the ON state, and display the first check control in the display state indicating being selected.

In S230, in a case that the first control mode indicated by the first preset control is in the ON state, first control information targeted for a target part of the virtual object is received.

In some embodiments of the present disclosure, the electronic device may enable the first control mode indicated by the first preset control while displaying the first preset control in the first display state, so that the first control mode is in the ON state.

In other embodiments of the present disclosure, before displaying the first preset control in the first display state, the electronic device may enable the first control mode indicated by the first preset control, so that the first control mode is in the ON state.

In still other embodiments of the present disclosure, after displaying the first preset control in the first display state, the electronic device may enable the first control mode indicated by the first preset control, so that the first control mode is in the ON state.

Specifically, in a case that the first control mode is in the ON state, the electronic device may receive the first control information regarding control performed the user for the target part of the virtual object, where the first control information may be control information corresponding to the first control mode.

In S240, a part model of the target part is replaced with a target model corresponding to the first control information for display.

The first control information may correspond to the target part of the virtual object, and is used in replacing the part model of the target part for display. The target model is a new part model of the target part generated based on the first control information. In an embodiment of the present disclosure, the electronic device may display an object model subjected to replacement in which the part model of the target part is replaced with the target model.

Further, the target model may further include a new part model generated based on the first control information and the part model of the target part.

In an embodiment of the present disclosure, after receiving the first control information targeted for the target part of the virtual object, the electronic device may generate the target model based on the first control information, and replace the part model of the target part in the virtual object with the target model for display, so that the user can control the virtual object in the first control mode.

In an embodiment of the present disclosure, the electronic device can display at least one preset control, so that the user can select a desired control mode from control modes indicated by the at least one preset control. In a case that the first trigger operation performed by the user on the first preset control corresponding to the selected control model is detected, the first preset control can be displayed in the first display state, and the first control mode indicated by the first preset control can be in the ON state, so that the first control information targeted for the target part of the virtual object can be received in a case that the first control mode is in the ON state, and the part model of the target part is replaced with the target model corresponding to the first control information for display. In this way, the electronic device can perform personalized adjustment on the object model of the virtual object based on the first control information, so that the user can flexibly control the virtual object according to his own needs, thereby improving the user experience.

In another embodiment of the present disclosure, in order to further improve the control flexibility of the virtual object, in response to detecting the first trigger operation on the first preset control in the at least one preset control, the electronic device simultaneously changes the display state of a preset control associated with the first preset control and changes state of a control mode associated with the first control mode.

In some embodiments of the present disclosure, in response to detecting the first trigger operation on the first preset control in the at least one preset control, the method for displaying a virtual object may further include:

switching a second preset control in the at least one preset control from the first display state to the second display state, where the second display state is used to indicate a control mode indicated by a corresponding preset control being in the OFF state.

The second control mode indicated by the second preset control is prohibited from being in the ON state when the first control mode is in the ON state, that is, the second preset control is prohibited from being in the first display state when the first preset control is in the first display state.

In response to detecting the first trigger operation performed by the user on the first preset control displayed in the second display state, the electronic device may determine the second preset control which is displayed in the first display state when the first trigger operation is detected and is associated with the first preset control, disable the second control mode indicated by the second preset control to control the second control mode to be in the OFF state, and switch the display of the second preset control from the first display state to the second display state.

Taking the preset control being a switch control as an example, the electronic device may, in response to detecting the trigger operation performed by the user on any switch control displayed in the OFF display state, determine a switch control which is currently enabled and cannot be enabled when the triggered switch control is enabled. When the control mode indicated by the triggered switch control is in the ON state, the control mode indicated by the determined switch control is controlled to be in the OFF state, and when the triggered switch control is displayed in the ON display state, the determined switch control is displayed in the OFF display state.

Continuing to refer to FIG. 3, in a case that the 3D expression mode is enabled, if the user wants to enable the speech broadcast mode, the user may click the "speech broadcast" switch 307 (not shown).

Figure 5:
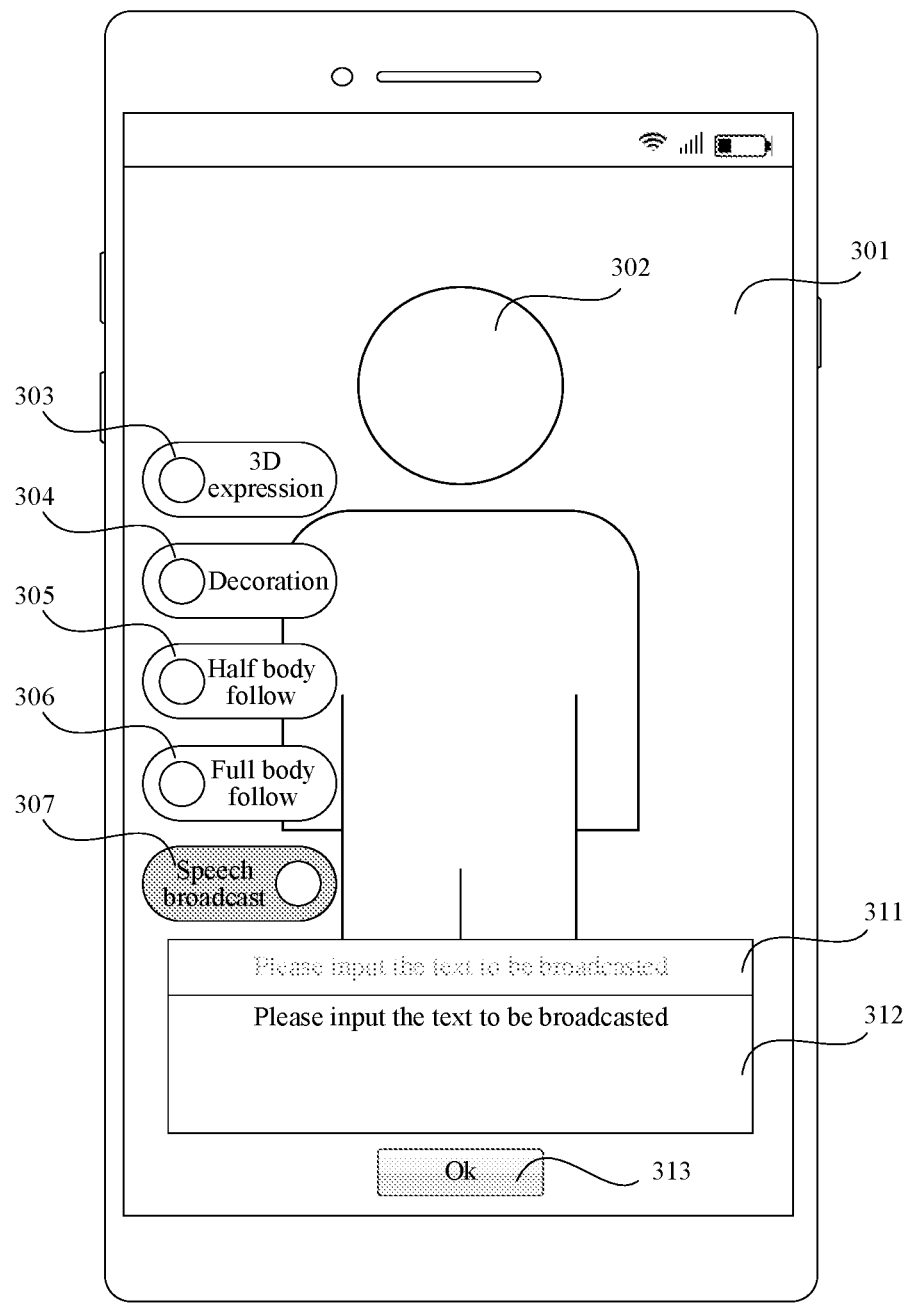
FIG. 5 is a schematic diagram of a virtual object interaction page according to yet another embodiment of the present disclosure.

Referring further to FIG. 5, FIG. 5 shows a schematic diagram of a virtual object interaction page according to still another embodiment of the present disclosure. As shown in FIG. 5, since the 3D expression mode and the speech broadcast mode cannot be enabled at the same time, that is, the "3D expression" switch 303 and the "speech broadcast" switch 307 cannot be enabled at the same time, after the user clicks the "speech broadcast" switch 307, the electronic device may enable the speech broadcast mode and disable the 3D expression mode at the same time, so that the speech broadcast mode is in the ON state and the 3D expression mode is in the OFF state, and then the display of the "speech broadcast" switch 307 is switched from the OFF display state to the ON display state, and at the same time the display of the "3D expression" switch 303 is switched from the ON display state to the OFF display state.

Taking the preset control being a check control as an example, in response to detecting the trigger operation performed by the user on any check control displayed in the display state indicating being unselected, the electronic device may determine a check control which is currently selected and cannot be selected when the triggered check control is selected. When the control mode indicated by the triggered check control is controlled to be in the ON state, the control mode indicated by the determined check control is controlled to be in the OFF state. When the triggered check control is displayed in the display state indicating being selected, the determined check control is displayed in the display state indicating being unselected.

Therefore, the electronic device can intelligently change the display state of the second preset control that cannot be in the same display state as the first preset control triggered by the user in response to the user's operation, and automatically change the state of the second control mode that cannot be enabled when the first control mode is enabled, thereby further improving the control flexibility and stability of the virtual object, and improving the user experience.

In other embodiments of the present disclosure, in response to detecting the first trigger operation on the first preset control in the at least preset control, the method for displaying a virtual object may further include:

maintaining a third preset control in the at least one preset control in the first display state.

A third control mode indicated by the third preset control is allowed to be in the ON state when the first control mode is in the ON state, that is, the third preset control is allowed to be in the first display state when the first preset control is in the first display state.

The electronic device may, in response to detecting the first trigger operation performed by the user on the first preset control displayed in the second display state, determine the third preset control displayed in the first display state when the first trigger operation is detected. Then, the third control mode indicated by the third preset control is maintained in the ON state, and the third preset control is maintained to be displayed in the first display state.

Taking the preset control being a switch control as an example, the electronic device may, in response to detecting the trigger operation performed by the user on any switch control displayed in the OFF display state, determine a switch control which is currently enabled and is allowed to be enabled when the triggered switch control is enabled. Then, the control mode indicated by the triggered switch control is controlled to be in the ON state, and the triggered switch control is displayed in the ON display state, and the state of the determined switch control and the control mode indicated by the determined switch control is remained unchanged.

Continue to refer to FIG. 3 and FIG. 4. In FIG. 3, if the user wants to enable the decoration mode, the user may click the "decoration" switch 304. Since the 3D expression mode and the decoration mode are allowed to be enabled at the same time, that is, the "3D expression" switch 303 and the "decoration" switch 304 can be enabled at the same time. Therefore, in FIG. 4, after the user clicks the "decoration" switch 304, the electronic device may directly enable the decoration mode, so that the decoration mode is in the ON state, and then switch the display of the "decoration" switch 304 from the OFF display state to the ON display state, without changing the state of the "3D expression" switch 303 and the 3D expression mode.

Taking the preset control being a check control as an example, the electronic device may, in response to detecting the trigger operation performed by the user on any check control displayed in the display state indicating being unselected, determine a switch control which is currently selected and is allowed to be enabled when the triggered switch control is enabled. Then the control mode indicated by the triggered switch control is controlled to be in the ON state, the triggered switch control is displayed in the display state indicating being selected, and the state of the determined switch control and the control mode indicated by the determined switch control remain unchanged.

Thus, the electronic device can intelligently maintain the display state of the third preset control that is allowed to be in the same display state as the first preset control triggered by the user in response to the user's operation, and maintain the state of the third preset control that is allowed be enabled when the first control mode is enabled, further improving the control flexibility and richness of virtual object and improving the user experience.

In the embodiments, optionally, the electronic device may further receive second control information regarding control performed by the user for a corresponding part of the virtual object, and replace the part model of the corresponding part with a model corresponding to the second control information for display, so that the object model of the virtual object can be adjusted and displayed based on the second control information.

The second control information may be control information corresponding to the third control mode, and an implementation for adjusting the object model of the virtual object based on the second control information is similar to an implementation for adjusting the object model of the virtual object based on the first control information.

As a result, the electronic device can receive control information corresponding to different control modes in a case that the virtual object is in multiple control modes, and control the virtual object correspondingly based on different control information, so as to flexibly control the virtual object and enhance the richness of the effect.

In still other embodiments of the present disclosure, in response to detecting the first trigger operation on the first preset control in the at least one preset control, a fourth preset control in the at least one preset control is maintained in the second display state.

A fourth control mode indicated by the fourth preset control is allowed to maintain in a different state from the first control mode at the same time, that is, the fourth preset control is allowed to maintain in a different display state from the first preset control at the same time, which is not repeated herein.

Further, the electronic device maintains displaying the fourth preset control in the second display state when detecting the first trigger operation on the fourth preset control.

Continue to refer to FIG. 3 and FIG. 4. In FIG. 3, if the user wants to enable the decoration mode, the user may click the "decoration" switch 304. Since the disabled switches other than the "decoration" switch 304 are allowed to be disabled when the "decoration" switch 304 is enabled, in FIG. 4, after the user clicks the "decoration" switch 304, the electronic device may refrain from enabling the "half body follow" switch 305, the "full body follow" switch 306, and the "speech broadcast" switch 307.

Therefore, the electronic device can intelligently maintain the display state of the fourth preset control that is allowed to be in a different display state from the first preset control triggered by the user in response to the user's operation, further improving the control flexibility of virtual object and improving the user experience.

In still other embodiments of the present disclosure, in response to detecting the first trigger operation on the first preset control in the at least one preset control, the electronic device switches a fifth preset control in the at least one preset control from the second display state to the first display state.

A fifth control mode indicated by the fifth preset control is prohibited from being in a different state from that of the first control mode at the same time, that is, the fifth preset control is prohibited from being in a different display state from that of the first preset control at the same time, which is not repeated herein.

Further, the electronic device displays the fifth preset control in the second display state when detecting the first trigger operation on the fifth preset control.

Therefore, the electronic device can intelligently change the display state of the fifth preset control that cannot be in a different display state from that of the first preset control triggered by the user in response to the user's operation, thereby further improving the control flexibility of the virtual object and improving the user experience.

In still other embodiments of the present disclosure, after step S220, the method for displaying a virtual object may further include:

in response to detecting a second trigger operation on the first preset control in the at least one preset control, the electronic device switches the first preset control from the first display state to the second display state.

Optionally, the second trigger operation may be used to switch the display of the first preset control from the first display state to the second display state, that is, the second trigger operation may be a trigger operation performed by the user on the preset control displayed in the first display state.

The electronic device may continuously detect the trigger operation performed by the user on the preset control, and in response to detecting the second trigger operation performed by the user on the first preset control displayed in the first display state, control the first control mode indicated by the first preset control to be in the OFF state, and simultaneously switch the display of the first preset control from the first display state to the second display state.

It should be noted that in response to detecting the second trigger operation, the electronic device may simultaneously change the display state of the preset control associated with the first preset control and the state of the control mode associated with the first control mode. The method is similar to the above method performed when the first trigger operation is detected, which is not repeated herein.

Therefore, in a case that the user disables the first control mode, the electronic device can intelligently change the state of the associated control mode, further improving the control flexibility of the virtual object and improving the user experience.

In yet another embodiment of the present disclosure, different control modes correspond to different manners of receiving control information. Hereinafter, manners of receiving control information in the embodiments of the present disclosure are further illustrated by using different control modes as examples.

In some embodiments of the present disclosure, the first control mode may include a 3D expression mode.

Correspondingly, the first control information received in step S230 may specifically include a preset expression, the target part may be a head part, and the target model may include a head model with the preset expression.

Therefore, in the 3D expression mode, based on the preset expression corresponding to the first control information, the expression of the virtual object may always be maintained as the preset expression.

In other embodiments of the present disclosure, the first control mode may include a decoration mode.

Correspondingly, receiving the first control information targeted for the target part of the virtual object in step S230 may specifically include:

receiving an image changing operation targeted for the target part, where the image changing operation is used to select a target decoration to be worn on the target part of the virtual object; and using the target decoration selected by the image changing operation as the first control information;

where, the target part is a part to be decorated by the target decoration, and the target model includes a target decoration model of the target decoration Specifically, the user may perform the image changing operation on the target part of the virtual object in the decoration mode, to wear the target decoration on the target part of the virtual object. The electronic device may receive the image changing operation performed by the user on the target part, and after receiving the image changing operation, use the target decoration selected by the image changing operation as the first control information, and then adjust, based on the first control information, the part model of the target part into a target decoration model including the target decoration, to replace the part model of the target part with the target decoration model for display.

Further, the target decoration may include at least one of: a face decoration, a head decoration and a clothing decoration.

The face decoration may include at least one of a facial features decoration, a facial contour decoration, and a facial adornment decoration. The facial features decoration may include pupils, eyebrows, eyelids, noses, mouths, and the like. The facial contour decoration may include face shape decoration, ear shape decoration, and the like, and the facial adornment decoration may include decoration of facial graffiti and accessories worn on the face such as glasses and pearl veneers.

The head decoration may include at least one of a hairstyle decoration and a headgear decoration. The hairstyle decoration may include a decoration such as hair length, hair style, and hair color. The headgear decoration may include hairpins, hats, and the like.

The clothing decoration may include at least one of a clothes decoration, a clothes accessory decoration, a footwear decoration, and an accessory decoration.

In an embodiment of the present disclosure, in the decoration mode, before receiving the image changing operation on the virtual object, the electronic device may display a decoration selection control at a predetermined position on the virtual object interaction page. Decoration images of preset decorations may be displayed in the decoration selection control, and the user can input the image changing operation targeted for the decoration image of the target decoration in the preset decorations.

The predetermined position may be any position on the virtual object interaction page, for example the bottom or right side of the virtual object interaction page, that is, a position where the preset control is not blocked.

In some embodiments, the image changing operation may be a selection operation, such as a click operation, a double-click operation, a long-press operation, a voice control operation, an expression control operation, performed by the user on the decoration image of the target decoration in the preset decorations.

Continuing to refer to FIG. 4, after the user clicks the "decoration" switch 304, the electronic device may switch the display of the "decoration" switch 304 from the OFF display state to the ON display state, and display a decoration selection control 308 at the bottom of the virtual object interaction page 301. The decoration selection control 308 includes multiple decoration category tabs 309 and a decoration display interface. Category icon corresponding to each decoration category may be displayed in the decoration category tab 309. After the user clicks any decoration category tab 309, the decoration category tab 309 is displayed in a selected state, and the decoration images 310 of decorations in each decoration category corresponding to the decoration category tab 309 may be displayed in the decoration display interface. The user may click any decoration image 310, and the electronic device may use the target decoration corresponding to the clicked decoration image 310 as the first control information.

In other embodiments, the image changing operation may be an operation of the user for dragging the decoration image of the target decoration in the preset decorations towards the target part to be decorated by the target decoration.

Continuing to refer to FIG. 4, the user may drag any decoration image 310 toward the target part to be decorated by the decoration image 310 in the object model 302, and the electronic device may use the target decoration corresponding to the dragged decoration image 310 as the first control information.

In an embodiment of the present disclosure, the object model of the virtual object may be a model obtained by merging the full-body model of the virtual object and the current decoration model. Specifically, the part model of any part of the virtual object may be a model obtained by merging the part body model of the part and the current decoration model corresponding to the decoration currently worn by the part.

In some embodiments, after obtaining the target decoration, the electronic device may query a target basic decoration model corresponding to the target decoration in preset basic decoration models, and then merge the target basic decoration model into the part body model of the target part to obtain a target decoration model of the target decoration, and replace the part model of the target part of the virtual object with the target decoration model for display.

Specifically, the electronic device may input the target basic decoration model and the part body model of the target part into a preset merging model, so as to obtain the target decoration model of the target decoration.

In other embodiments, after obtaining the target decoration, the electronic device may send the target decoration to the server, so that the server generates a target decoration model of the target decoration.

The server may be the server 103 shown in FIG. 1.

It should be noted that the method for generating the target decoration model of the target decoration by the server is similar to the above method for generating the target decoration model of the target decoration by the electronic device, which is not repeated herein.

In these embodiments, optionally, after step S220, the method for displaying a virtual object may further include:
receiving a decoration hiding operation targeted for the decoration selection control, where the decoration hiding operation is used to trigger the hiding of the decoration selection control;
in response to the decoration hiding operation, hiding the decoration selection control; and
displaying a decoration display control at a target position, where the decoration display control is used to trigger displaying of the decoration selection control.

Optionally, the decoration hiding operation may be an operation on the decoration selection control, or may not be an operation on the decoration selection control.

In some embodiments, the decoration hiding operation may be an operation on a display area other than the decoration selection control, such as a click operation, a double-click operation, a long press operation, on a blank display area other than the decoration selection control.

In other embodiments, the decoration hiding operation may be an operation on the decoration selection control, such as a click operation, a double-click operation, a long press operation on a blank display area in the decoration selection control.

Optionally, the target position may be any position in the virtual object interaction page, which is not limited herein. For example, the target position may be the bottom or right side of the virtual object interaction page, that is, a position at which the preset control is not blocked.

Further, the electronic device may display the decoration display control at the target position.

Optionally, the decoration display control may be a "circular" button or a bar-shaped border, as long as the user can trigger the displaying of the decoration selection control, which is not limited herein.

The user may perform a third trigger operation on the decoration display control, and the third trigger operation may be a click operation, a double-click operation or a long-press operation on the decoration display control. The electronic device may receive the third trigger operation on the decoration display control, and resume the displaying of the decoration selection control in response to the third trigger operation.

Continuing to refer to FIG. 4, the user may click on a blank display area outside the decoration selection control 308 in the decoration mode, to trigger the hiding of the decoration selection control 308.

Figure 6:
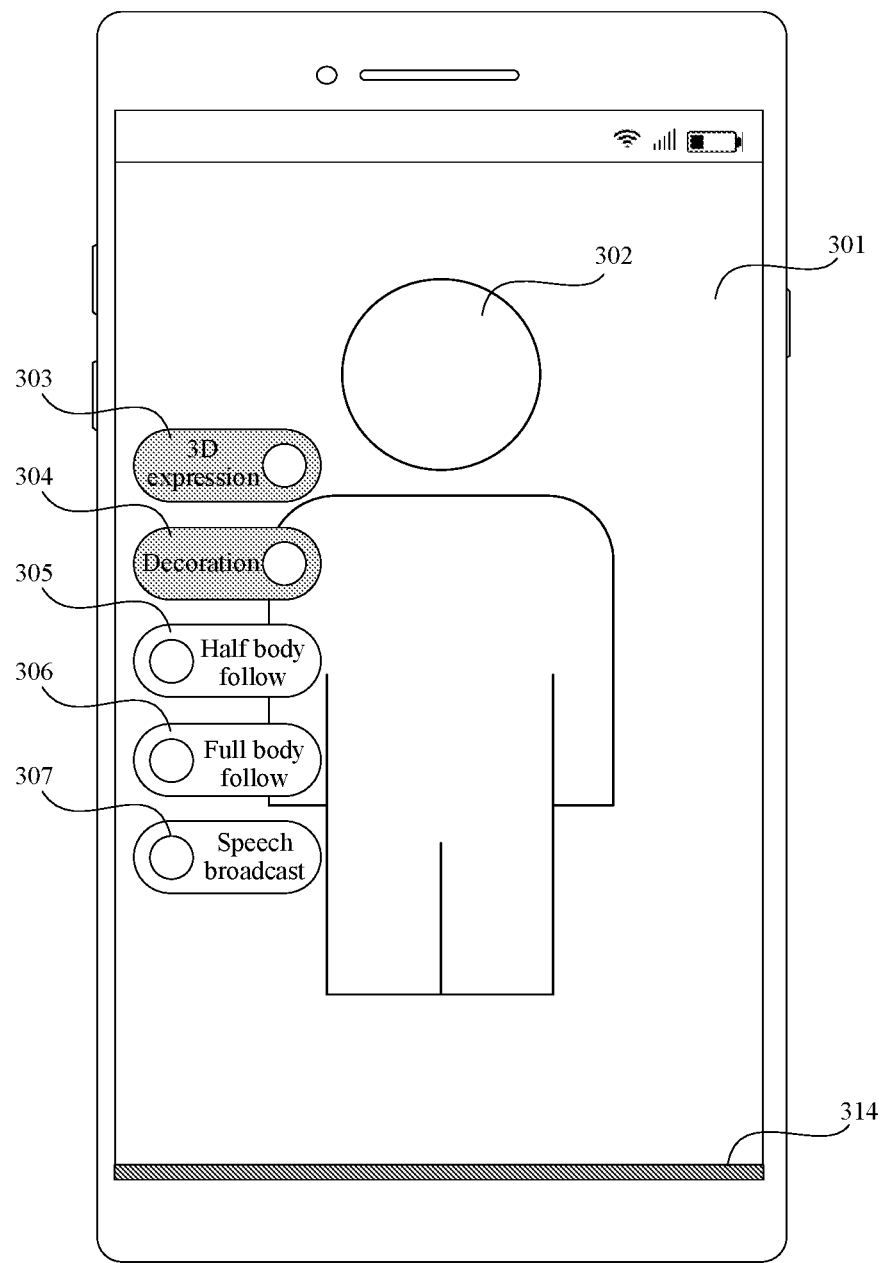
FIG. 6 is a schematic diagram of a virtual object interaction page according to still yet another embodiment of the present disclosure.

FIG. 6 shows a schematic diagram of a virtual object interaction page according to still yet another embodiment of the present disclosure. As shown in FIG. 6, after the electronic device receives the click operation performed by the user on the blank display area other than the decoration selection control 308, the decoration selection control 308 may be hidden, and a bar-shaped border 314 may be displayed at the bottom of the virtual object interaction page 301. When the user wants to open the decoration selection control 308, the user may click the bar-shaped border 314 to resume the displaying of the decoration selection control 308.

In this way, the user can flexibly perform face-forming and change decoration of the virtual object in the decoration mode according to his own needs, so that the virtual image of the virtual object can meet the personalized needs of the user.

In still other embodiments of the present disclosure, the first control mode may include an action following mode.

Correspondingly, receiving the first control information targeted for the target part of the virtual object in step S230 may specifically include:

receiving a real-time posture image; and using a target posture of the target part in the real-time posture image as the first control information.

The target model includes a target posture model of the target posture.

Specifically, the user may change the posture of his target part in the action following mode, and the electronic device may receive the real-time posture image including the target part of the user captured by the camera in real time, and after receiving the real-time posture image, use the target posture of the target part in the real-time posture image as the first control information, and then adjust, based on the first control information, a part model of the target part to a target posture model including the target posture, so as to replace the part model of the target part with the target posture model for display.

Specifically, the electronic device may extract posture features of key points in the target part in the real-time posture image, and use the posture features of the key points as the target posture of the target part.

In some embodiments, after obtaining the target posture of the target part in the real-time posture image, the electronic device may transfer the target posture in the real-time posture image to the part model of the target part of the virtual object through the motion transfer technology, to obtain the target posture model including the target posture.

In other embodiments, after obtaining the target posture of the target part in the real-time posture image, the electronic device may send the target posture to the server, so that the server transfers the target posture in the real-time posture image to the part model of the target part of the virtual object through the action transfer technology, to obtain the target posture model including the target posture.

Optionally, the real-time posture image may be a head image, upper body image, lower body image and whole body image of the user, which is not limited herein.

Further, the target part may include any one of: a head part, a local body part and a whole body part.

The head part may be any one of the face and the whole head. In a case that the head part includes the face, the target posture may be a facial posture, such as an expression. In a case that the head part includes the whole head, the target posture may be the whole head posture, such as tilting the head, and turning the face.

The local body part may be any one of hands, arms, feet, legs, head and shoulders, upper body, and lower body.

The whole body part may be the whole body of a subject including the head or the body of a subject not including the head.

In an embodiment of the present disclosure, optionally, the method for displaying a virtual object may further include:

after receiving the real-time posture image, superimposing and displaying the real-time posture image in a target display area.

The target display area may be a preset display area, which is not limited herein.

Optionally, in order to facilitate user operation, the target display area may be a display area at, such as the upper left corner, upper right corner or lower right corner, of the virtual object interaction page, where the preset control is not blocked.

Figure 7:
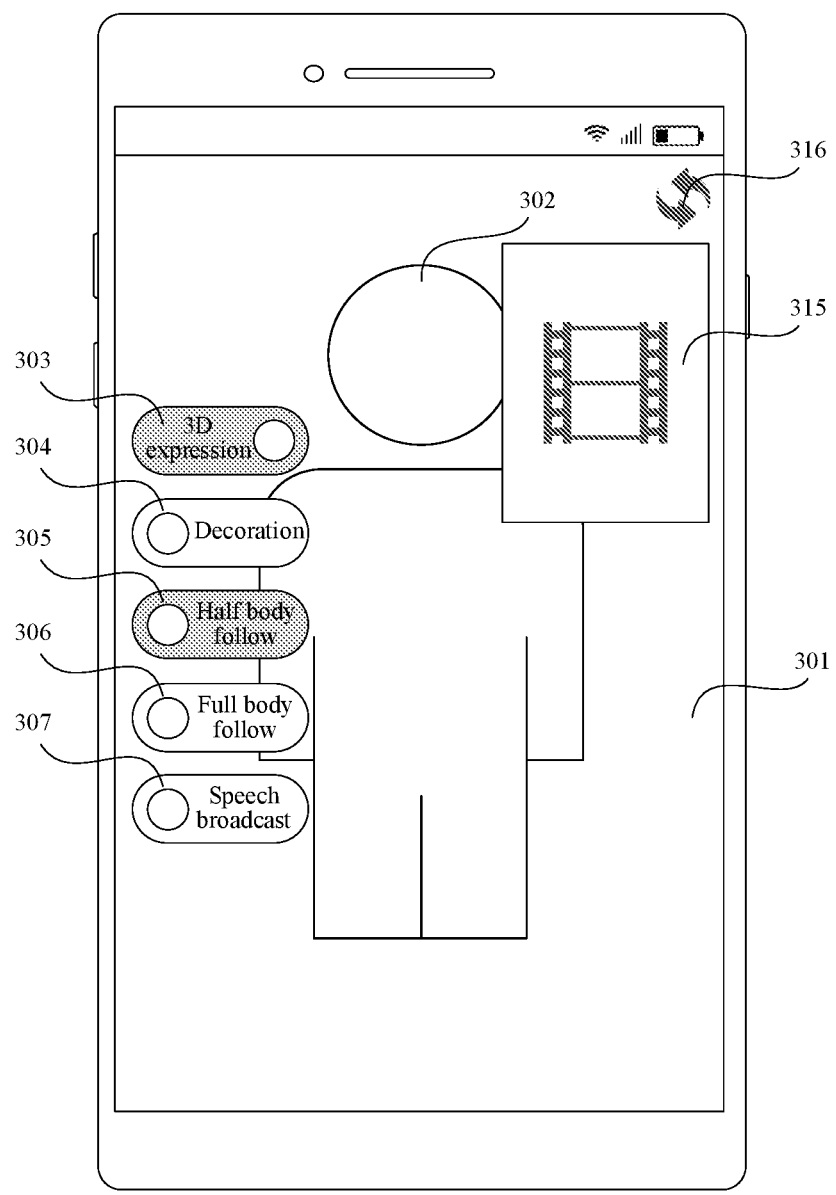
FIG. 7 is a schematic diagram of a virtual object interaction page according to still yet another embodiment of the present disclosure.

Continuing to refer to FIG. 3, if the user wants to enable the half body follow mode, the user may click the "half body follow" switch 305. FIG. 7 shows a schematic diagram of a virtual object interaction page according to still yet another embodiment of the present disclosure. As shown in FIG. 7, after the user clicks the "half body follow" switch 305, the electronic device may switch the display of the "half body follow" switch 305 from the OFF display state to the ON display state, and display a play window 315 on the upper right corner of the virtual object interaction page 301. The real-time posture image of the user may be displayed in the play window 315. The upper body posture of the object model 302 of the virtual object is consistent with the upper body posture of the user within the real-time posture image. In addition, since the "3D expression" switch 303 is in the ON state, the expression of the virtual object is always maintained as the preset expression.

Optionally, a camera switching button 316 may be further displayed in the upper right corner of the virtual object interaction page 301 shown in FIG. 7. The user may click the camera switching button 316 to switch between a front camera and a rear camera, so as to change the camera that captures the real-time posture image, so that the user can have more space for activities, further improving the user experience.

Therefore, in the action following mode, the action follow may be achieved for the virtual object, and the user can determine whether the posture of the virtual object is consistent with the user posture by comparison with the real-time posture image.

In order to further improve the user experience, optionally, before step S240, the method for displaying a virtual object may further include:

extracting a human biological feature in the real-time posture image; and comparing the human biological feature with a target biological feature, where the target biological feature includes a biological feature of the virtual object.

Correspondingly, step S240 may specifically include:
in a case that the human biological feature is the same as the target biological feature, replacing the part model of the target part with the target model for display.

Specifically, the electronic device may input the captured real-time posture image into a preset biological feature extraction model at a preset time interval, so as to extract the human biological feature in the real-time posture image. Then, the electronic device may compare the human biological feature with the target biological feature used to generate the virtual object. In a case that the human biological feature is the same as the target biological feature, the part model of the target part is replaced with the target model for display. Otherwise, the part model of the target part is not replaced with the target model.

The human biological feature may include at least one of face feature, head and shoulder feature, and body shape feature of the user, which is not limited herein.

Optionally, the target biological feature may be of the same type as the human biological feature, so as to improve the accuracy of the comparison result.

Optionally, the specific method for comparing the human biological feature with the target biological feature used to generate the virtual object may be implemented as determining the similarity between the human biological feature and the target biological feature. In a case that the similarity is greater than or equal to a preset similarity threshold, it is determined that the human biological feature is the same as the target biological feature. In a case that the similarity is less than the preset similarity threshold, it is determined that the human biological feature is different from the target biological feature.

Therefore, the electronic device can determine whether the user who is operating the electronic device is the user who generates the virtual object, and only allow the virtual object to follow actions of the user generating the virtual object, to improve the security of the electronic device.

In still other embodiments of the present disclosure, the first control mode may include a broadcast mode.

Correspondingly, the receiving first control information targeted for the virtual object in step S230 may specifically include:
receiving a broadcast text input operation, where the broadcast text input operation is used to input a target text; and
using the target text as the first control information.

The target part includes a head part, and the target model includes a model of the head part which is broadcasting the target text.

In an embodiment of the present disclosure, in the broadcast mode, before receiving user operation of inputting the broadcast text, the electronic device may display a text input control at a predetermined position on the virtual object interaction page, and the user may perform the broadcast text input operation in the text input control, to input the target text to be broadcasted. After receiving the broadcast text input operation, the electronic device may use the target text input by the broadcast text input operation as the first control information, and then adjust, based on the first control information, the part model of the head part of the virtual object into a model including a head part which is broadcasting the target text, to replace the part model of the head part of the virtual object with the target model for display.

The predetermined position may be any position on the virtual object interaction page, such as the bottom or right side of the virtual object interaction page, that is, a position where the preset control is not blocked.

In some embodiments, the electronic device may perform speech conversion on the target text based on text-to-speech conversion technology to obtain target audio corresponding to the target text. Then, the electronic device uses the target audio to generate real-time facial expression animation, and transfers a facial posture in the real-time facial expression animation to the part model of the head part of the virtual object by using posture transfer technology, to obtain the target model including a head part which is broadcasting the target text.

In other embodiments, the electronic device may send the target text to the server, so that the server generates the target audio and the target model based on the target text.

It should be noted that the method for generating the target audio and the target model by the server is similar to the above method for generating the target audio and the target model by the electronic device, which is not repeated herein.

In an embodiment of the present disclosure, the electronic device may play the target audio corresponding to the target text while displaying the target model including the head part which is broadcasting the target text, to realize the speech broadcasting of the virtual object.

In some embodiments of the present disclosure, the broadcast text input operation may include a text input operation performed by the user in the text input control. In other embodiments of the present disclosure, in a case that the text input control has a text submission control, the broadcast text input operation may further include a text input operation of the user in the text input control and a trigger operation, such as a click operation, double-click operation, and long-press operation, performed by the user on the text submission control. In still other embodiments of the present disclosure, in a case that the text input control has a speech input function, the broadcasting text input operation may include an audio input operation of inputting/recording audio containing the target text. For example, the audio input operation may be an operation of reading the target text while the user is recording audio on the electronic device.

Continuing to refer to FIG. 5, a text input control 311 and the text submission control are displayed at the bottom of the virtual object interaction page 301. The text submission control may be an "OK" button 313. The user may input the target text to be broadcasted in the text input control 311, and after completing the text input, click the "OK" button 313, so that the electronic device can receive the target text and control the virtual object to broadcast the target text.

Optionally, for convenience of the user to check the entered text, the text input control 311 shown in FIG. 5 may include a text preview box 312. The text preview box 312 may display the text that the user has entered.

Therefore, in the broadcast mode, the electronic device may use the virtual object to broadcast the text input by the user, thereby further improving the user experience.

In order to further improve the user experience, optionally, after the target text is used as the first control information and before step S240, the method for displaying a virtual object may further include:
obtaining a decoration attribute of the virtual object;
selecting, from multiple preset text-to-speech conversion models, a target text-to-speech conversion model corresponding to the decoration attribute;

inputting the target text into the target text-to-speech conversion model for speech conversion to obtain a target audio; and generating the target model based on the target audio.

In the embodiment of the present disclosure, each decoration may be provided with attribute scores for different decoration styles in advance. The decoration styles may include being intellectual, cute, handsome, calm, sunny and so on. Taking the decoration being a dress as example, the dress has a preset attribute score for each of the decoration styles.

Further, each decoration style may be provided with a decoration attribute in advance. The decoration attribute may include any one of object type, object style, and the like. Taking the virtual object being a virtual human character as an example, the object type may be the type of human. The object style may be a character personality, such as being cheerful, lively, gentle, calm, sunny and other personalities.

In the process of generating the target audio and the corresponding target model by the electronic device, the electronic device may first obtain the attribute scores of the decorations, to which each decoration model merging with the object model belongs, for different decoration styles, and then for each decoration style, add up the attribute scores of the decoration models, to obtain a sum of the scores of the decoration style, and then select the decoration attribute corresponding to the decoration style with the highest total score, as the decoration attribute of the virtual object.

In an embodiment of the present disclosure, each preset text-to-speech conversion model corresponds to a decoration attribute, the electronic device may select a target text-to-speech conversion model corresponding to the decoration attribute of the virtual object from multiple preset text-to-speech conversion models, and input the target text into the target text-to-speech conversion model for speech conversion to obtain the target audio, so as to generate audio with sound characteristics consistent with the decoration feature of the virtual object.

Further, the electronic device may generate the target model based on the target audio with the sound feature consistent with the decoration feature of the virtual object, so that a facial expression and a mouth shape of the virtual object in the target model are consistent with the decoration feature of the virtual object, further improving the user experience.

In yet another embodiment of the present disclosure, in order to further improve the user experience, before step S210, the electronic device needs to generate an object model of the virtual object having a biological feature of the user based on a captured image uploaded by the user.

Specifically, before step S210, the method for displaying a virtual object may further include:

obtaining a captured image;

extracting a biological feature from the captured image; and generating an object model of the virtual object having the biological feature based on the extracted biological feature.

In an embodiment of the present disclosure, obtaining the captured image may specifically include any one of obtaining the captured image photographed by the user through a camera; and acquiring the captured image selected by the user from preset images.

Optionally, the captured image uploaded by the user may be a face image, a half-body image, and a whole-body image of the user, which is not limited herein.

Next, the manner of obtaining the captured image will be described in detail.

Figure 8:
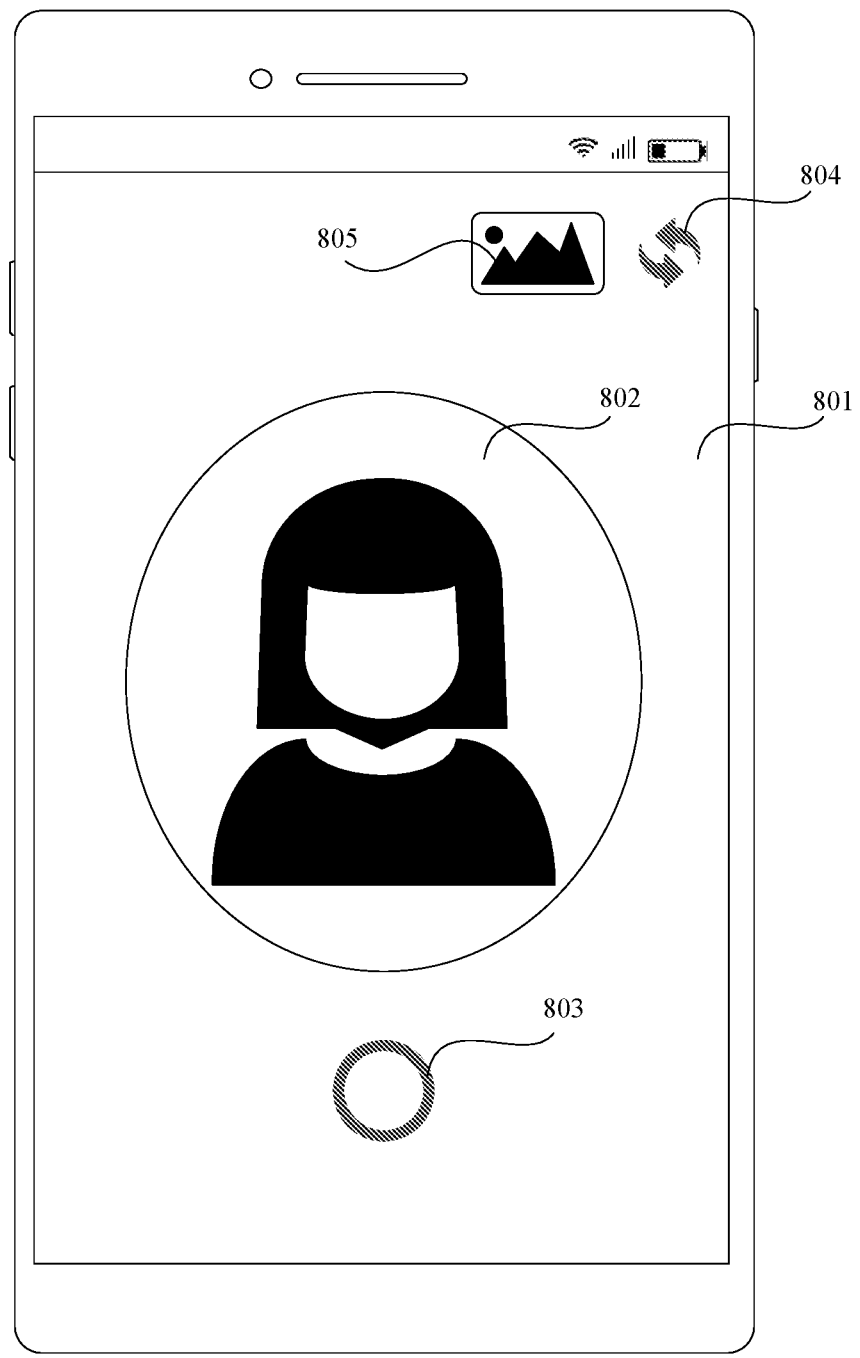
FIG. 8 is a schematic diagram of an image capturing page according to an embodiment of the present disclosure.

FIG. 8 shows a schematic diagram of an image capturing page according to an embodiment of the present disclosure. As shown in FIG. 8, a first image capturing page 801 is displayed on the electronic device, and the first image capturing page 801 may be a photographing page. A photographing preview frame 802, a photographing button 803 and a camera switching button 804 are displayed on the first image capturing page 801. The user may preview a current picture through the photographing preview frame 802, and click the photographing button 803 to photograph. The user may click the camera switching button 804 to switch between a front camera and a rear camera.

Figure 9:
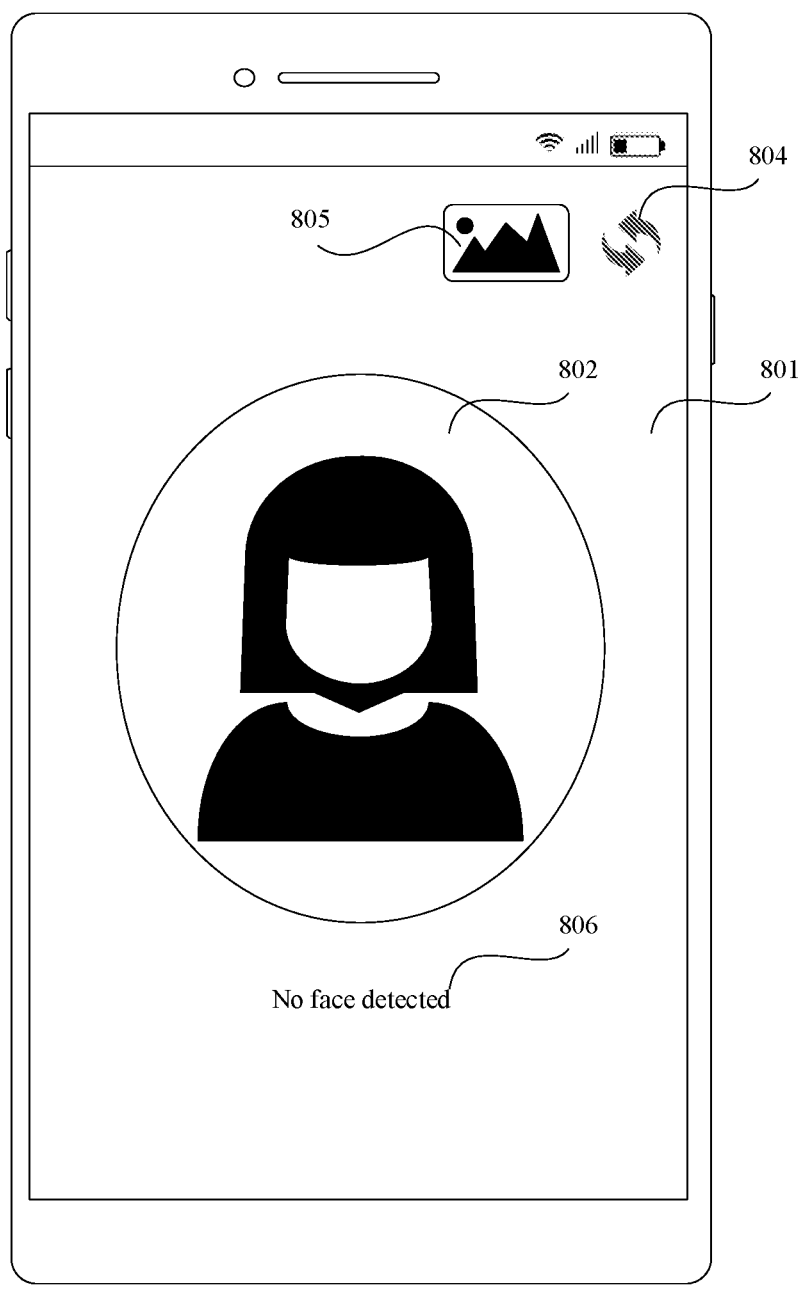
FIG. 9 is a schematic diagram of an image capturing page according to another embodiment of the present disclosure.

FIG. 9 shows a schematic diagram of an image capturing page according to another embodiment of the present disclosure. As shown in FIG. 9, after the user clicks the photographing button 803 to photograph, the captured image may be displayed in the photographing preview frame 802. The electronic device may perform face detection on the image. If no human face is detected, first prompt information 806 may be displayed. For example, the first prompt information 806 may be the text "No face detected". The first prompt information 806 may prompt the user that the current image cannot be used to generate the virtual object.

Figure 10:
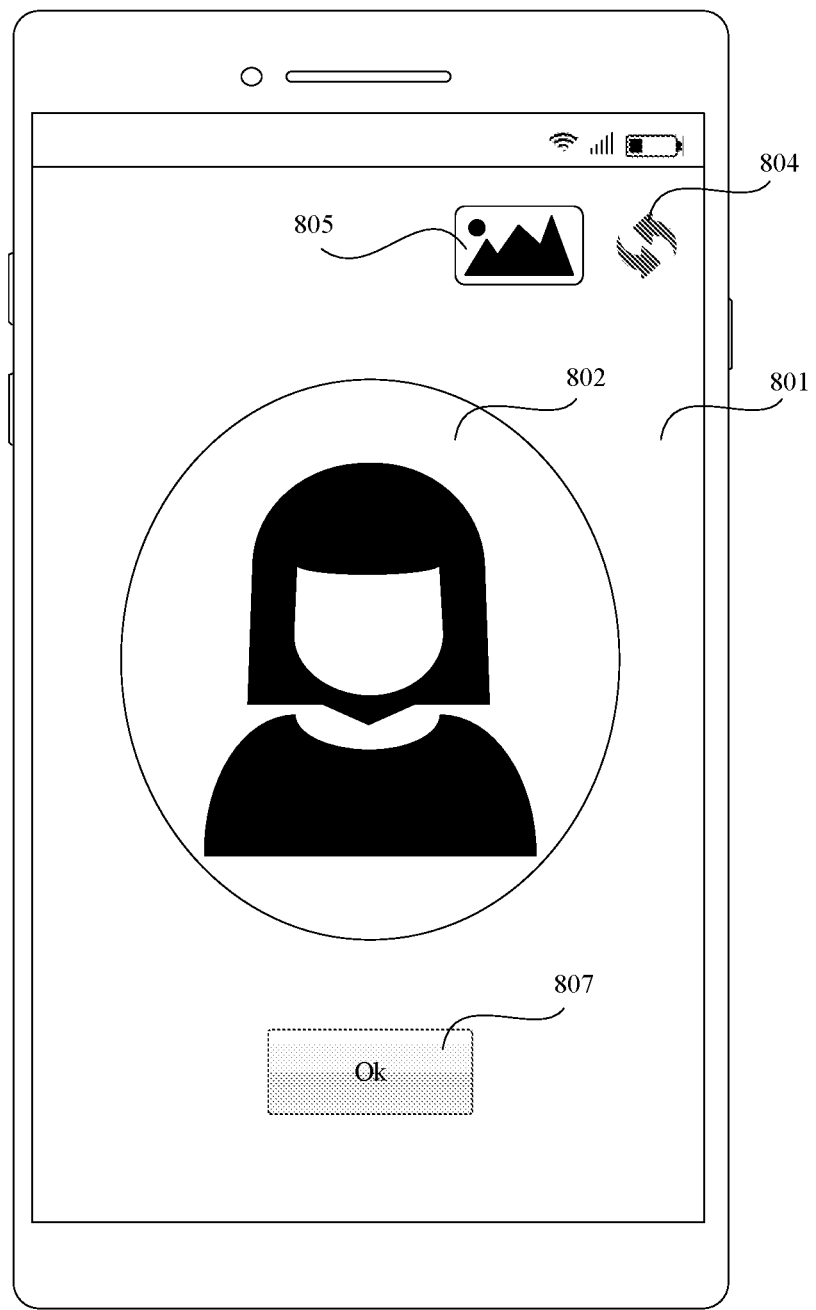
FIG. 10 is a schematic diagram of an image capturing page according to yet another embodiment of the present disclosure.

FIG. 10 shows a schematic diagram of an image capturing page according to yet another embodiment of the present disclosure. As shown in FIG. 10, after the user clicks the photographing button 803 to photograph, the captured image may be displayed in the photographing preview frame 802. The electronic device may perform face detection on the image. In a case that a human face is detected, a first confirmation control 807 may be displayed. For example, the first confirmation control 807 may be an "OK" button. The user may click the first confirmation control 807 to enable the electronic device to generate the virtual object based on the current image.

Continue to refer to FIGS. 8 to 10. Album identification 805 is further displayed on the first image capturing page 801. The user may click the album identification 805 to cause the electronic device to display images in the album, so that the user can select an image for generating the virtual object from the displayed images.

Figure 11:
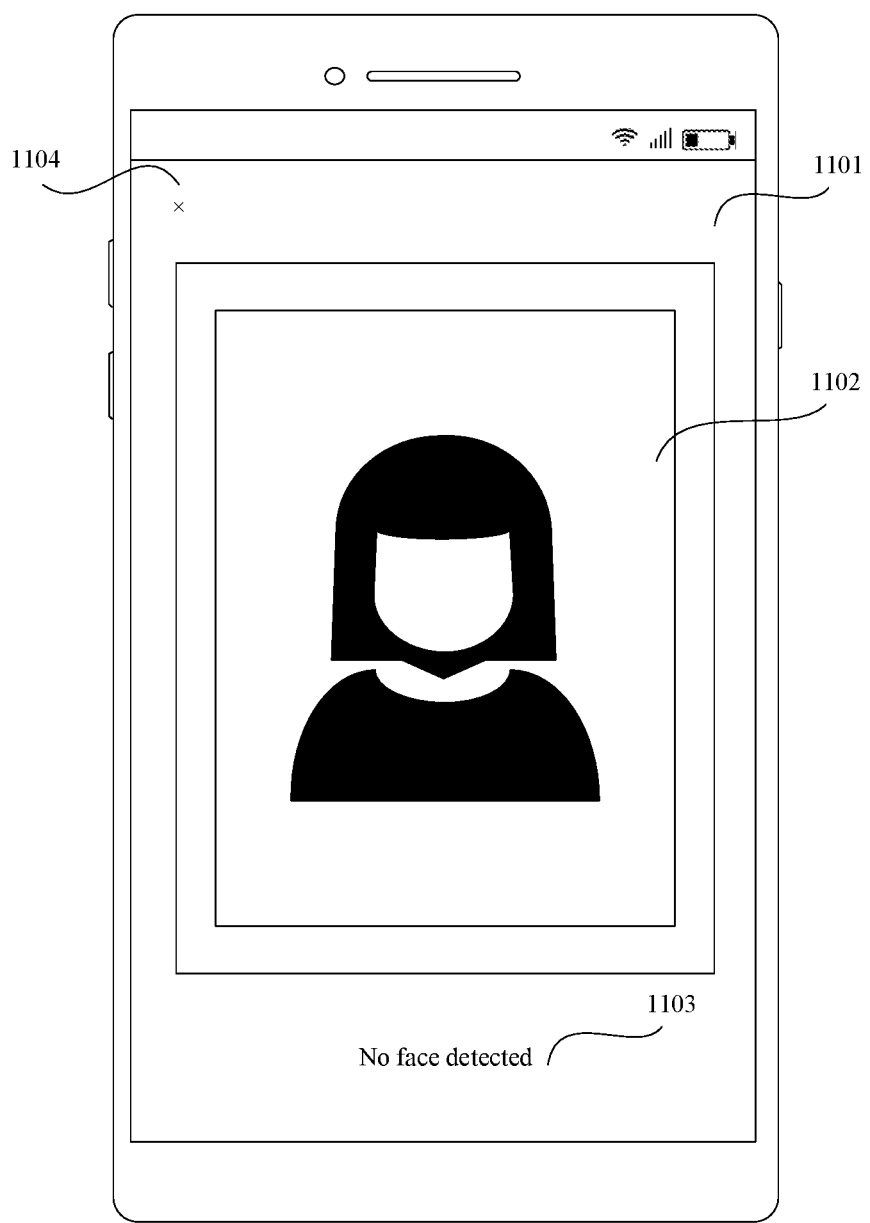
FIG. 11 is a schematic diagram of an image capturing page according to still yet another embodiment of the present disclosure.

FIG. 11 shows a schematic diagram of an image capturing page according to still yet another embodiment of the present disclosure. As shown in FIG. 11, after the user selects an image for generating the virtual object, the electronic device may display a second image capturing page 1101, which may be an image preview interface. An image 1102 selected by the user may be displayed on the second image capturing page 1101, and the electronic device may perform face detection on the image 1102. In a case that no face is detected, second prompt information 1103 may be displayed. For example, the second prompt information 1103 may be the text "No face detected". The second prompt information 1103 may prompt the user that the current image cannot be used to generate the virtual object. A cancel upload control 1104 may be displayed on the second image capturing page 1101. For example, the cancel upload control 1104 may be an "X" button. The user may click the cancel upload control 1104 to exit the second image capturing page 1101 and return to the album.

Figure 12:
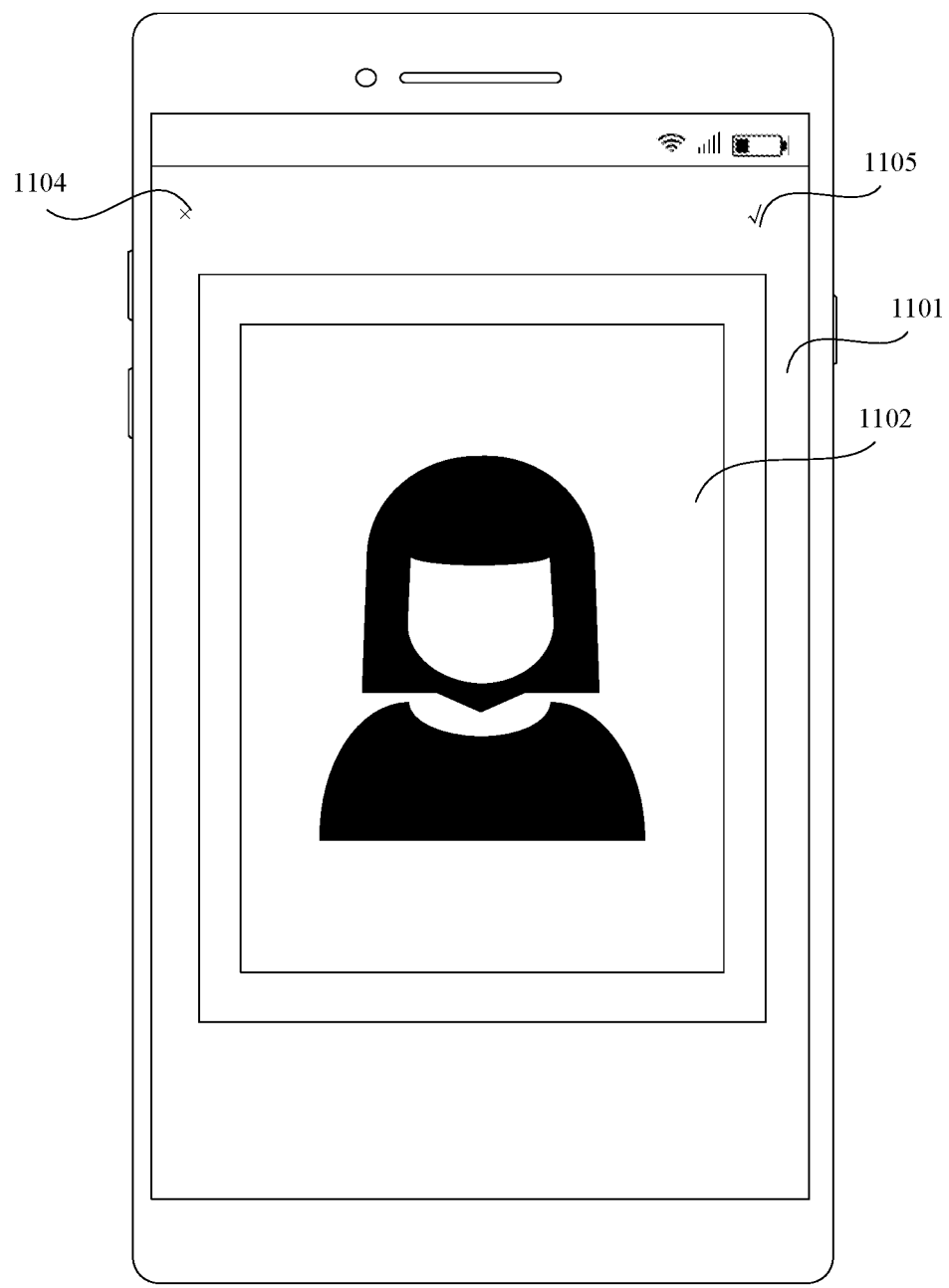
FIG. 12 is a schematic diagram of an image capturing page according to still yet another embodiment of the present disclosure.

FIG. 12 shows a schematic diagram of an image capturing page according to still yet another embodiment of the present disclosure. As shown in FIG. 12, after the user selects an image for generating a virtual object, the electronic device may display the second image capturing page 1101, which may be an image preview interface. The image 1102 selected by the user may be displayed in the second image capturing page 1101, and the electronic device may perform face detection on the image 1102. In a case that a face is detected, a second confirmation control 1105 may be displayed. For example, the second confirmation control 1105 may be "√" button. The user may click the second confirmation control 1105 to cause the electronic device to generate a virtual object based on the image 1102. In addition, a de-selection control 1104 may be displayed on the second image capturing page 1101. For example, the de-selection control 1104 may be an "X" button. The user may click the de-selection control 1104 to exit the second image capturing page 1101 and return to the album.

In some embodiments of the present disclosure, the biological feature extracted by the electronic device may include at least one of a facial feature, a head and shoulder feature, and a human pose feature of the user, which is not limited herein.

For example, in a case that the captured image is a face image, the biological feature extracted by the electronic device may include the facial feature of the user. For another example, if the captured image is a whole-body image, the biological feature extracted by the electronic device may include the facial feature and the human pose feature of the user.

In some embodiments, after obtaining the captured image, the electronic device may first perform face detection on the captured image, and in response to detecting a human face, input the captured image into a preset biological feature extraction model to extract a biological feature in the captured image, and then input the extracted biological feature into a preset object generation model to obtain a full-body model of the virtual object with the biological feature, and then merge a preset clothing model into the full-body model to obtain an object model of the virtual object.

In other embodiments, after obtaining the captured image, the electronic device may first perform face detection on the captured image, and in response to detecting a human face, input the captured image into a preset biological feature extraction model to extract the biological feature in the captured image. Then, the extracted biological feature is sent to the server, so that the server generates an object model of the virtual object with the biological feature based on the extracted biological feature. The method for generating the object model by the server is similar to the above method for generating the object mode by the electronic device, which is not repeated herein.

Therefore, a whole-body object model of the virtual object having the biological feature of the user can be generated, improving the user experience.

In other embodiments of the present disclosure, after obtaining the captured image, the method for displaying a virtual object may further include:
 extracting a decoration feature in the captured image.
 Correspondingly, generating the object model of the virtual object having the biological feature based on the extracted biological feature may specifically include:
  generating the object model of the virtual object having the biological feature based on the extracted biological feature and the decoration feature.
 Optionally, the extracted decoration feature may include at least one of a face decoration feature, a headgear feature, a clothing feature, and a clothing accessory feature of the user.

For example, in a case that the captured image is a face image, the biological feature extracted by the electronic device may include the user's facial feature, and the extracted decoration feature may include the headwear feature. For another example, if the captured image is a whole-body image, the biological feature extracted by the electronic device may include the facial feature and the human pose feature of the user, and the extracted clothing feature may include the clothing feature.

In some embodiments, after obtaining the above captured image, the electronic device first performs face detection on the captured image, and in response to detecting a human face, may input the captured image into a preset biological feature extraction model to extract the biological feature in the captured image, and input the captured image into a preset decoration feature extraction model to extract a decoration feature in the captured image, and then input the extracted biological feature into a preset virtual object generation model to obtain a full body model of the virtual object with the biological feature. Next, the electronic device may query a basic decoration model corresponding to each extracted decoration feature based on the correspondence between the preset decoration feature and the basic decoration model, and merge the queried basic decoration model to a part body model of the part to which the decoration corresponding to the decoration feature belongs, to obtain the object model of the virtual object having the decoration feature.

In other embodiments, after obtaining the captured image, the electronic device may first perform face detection on the captured image, and in response to detecting a human face, may input the captured image into a preset biological feature extraction model to extract the biological feature in the captured image and input the captured image into a preset decoration feature extraction model to extract the decoration feature in the captured image, and then send the extracted biological feature and decoration feature to the server, so that the server generates an object model of the virtual object with the biological feature and the decoration feature based on the extracted biological feature and decoration feature. The method for generating the object model by the server is similar to the above method for generating the object model by the electronic device, which is not repeated herein.

Thereby, the electronic device may generate a full-body object model of the virtual object with the biological feature and the decoration feature of the user, to improve the user experience.

In yet another embodiment of the present disclosure, in order to improve the security of the electronic device, before step S220, the method for displaying a virtual object may further include:
 capturing a user image;
 extracting a user biological feature in the user image;
 comparing the user biological feature with a target biological feature, where the target biological feature includes a biological feature of the virtual object; and
 detecting the first trigger operation in a case that the user biological feature is the same as the target biological feature.

Specifically, the electronic device may capture a user image of a user who is operating the electronic device through the front camera at a preset time interval, and input the captured user image into a preset biological feature extraction model to extract the user biological feature in the user image. Then, the electronic device may compare the user biological feature with the target biological feature used to generate the virtual object. In a case that the user biological feature is the same as the target biological feature, the electronic device detects the first trigger operation, otherwise, the electronic device does not detect the first trigger operation.

The user biological feature may include at least one of a facial feature, a head and shoulder feature, and a human pose feature of the user, which is not limited herein.

Optionally, the target biological feature may be the same type of biological feature as the user biological feature, to improve the accuracy of the comparison result.

Optionally, the implementation for comparing the user biological feature with the target biological feature for generating the virtual object may include determining the similarity between the user biological feature and the target biological feature. In a case that the similarity is greater than or equal to a preset similarity threshold, it is determined that the user biological feature is the same as the target biological feature. In a case that the similarity is less than the preset similarity threshold, it is determined that the user biological feature is different from the target biological feature.

Therefore, the electronic device may detect whether the user who is operating the electronic device is the user who generates the virtual object, and only allow the user generating the virtual object to change the control mode, so as to improve the security of the electronic device.

In other embodiments of the present disclosure, the preset control may be displayed in a third display state. The third display state may be used to indicate the preset control being in an inoperable state. For example, the third display state may be a grayed-out display state, so that the preset control cannot be triggered.

In these embodiments, after comparing the user biological feature with the target biological feature, the method for displaying a virtual object may further include:

displaying the at least one preset control in the third display state in a case that the user biological feature is different from the target biological feature.

Specifically, in a case that the electronic device determines that the user biological feature is different from the target biological feature, the at least one preset control may be displayed in the third display state, so that none of the at least one preset control can be triggered.

Figure 13:
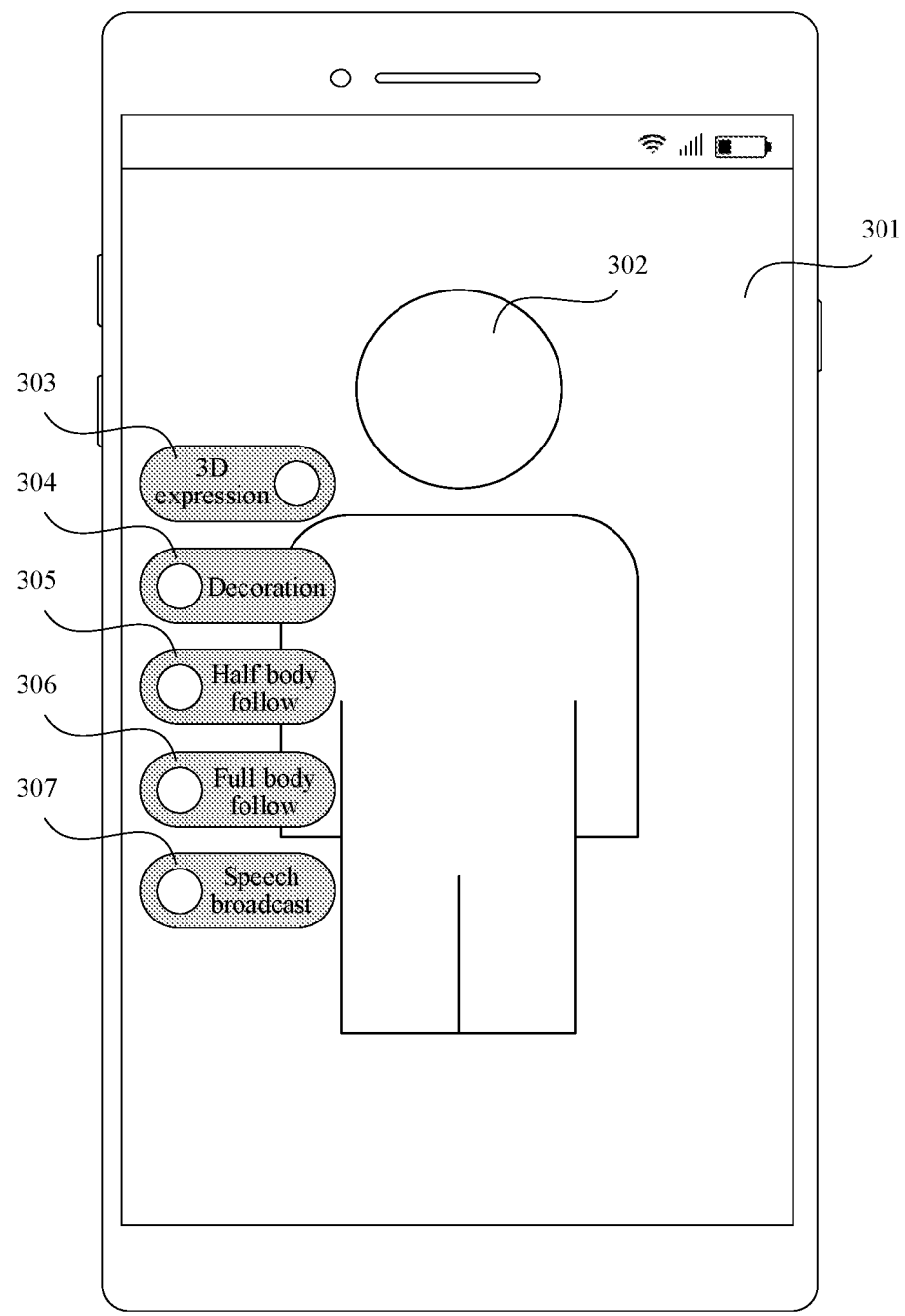
FIG. 13 is a schematic diagram of a virtual object interaction page according to still yet another embodiment of the present disclosure.

FIG. 13 shows a schematic diagram of a virtual object interaction page according to still yet another embodiment of the present disclosure. As shown in FIG. 13, a virtual object interaction page 301 is displayed on the electronic device, and an object model 302 of the virtual object and five switch controls are displayed on the virtual object interaction page 301. The five switch controls may include a "3D expression" switch 303, a "decoration" switch 304, a "half body follow" switch 305, a "full body follow" switch 306 and a "speech broadcast" switch 307. In a case that the electronic device detects that the user who is operating the electronic device is not the user who generated the virtual object, the five switch controls may be displayed in the grayed-out display state, so that the "3D expression" switch 303, the "decoration" switch 304, the "half body follow" switch 305, the "full body follow" switch 306 and the "speech broadcast" switch 307 are all grayed out and cannot be triggered.

In an embodiment of the present disclosure, the preset control may be in the first display state and the third display state at the same time, or in the second display state and the third display state at the same time.

Continue to refer to FIG. 13. The "3D expression" switch 303 may be in the ON display state and the grayed out display state at the same time, the "decoration" switch 304, the "half body follow" switch 305, the "whole body follow" switch 306 and the "speech broadcast" switch 307 may be in the OFF display state and the grayed out display state at the same time. That is, when the electronic device displays the switch control in the grayed out display state, the ON or OFF state of the switch control will not be changed.

As a result, the electronic device can further prevent the electronic device from being manipulated by a user other than the user generating the virtual object, thereby further improving the security of the electronic device.

Figure 14:
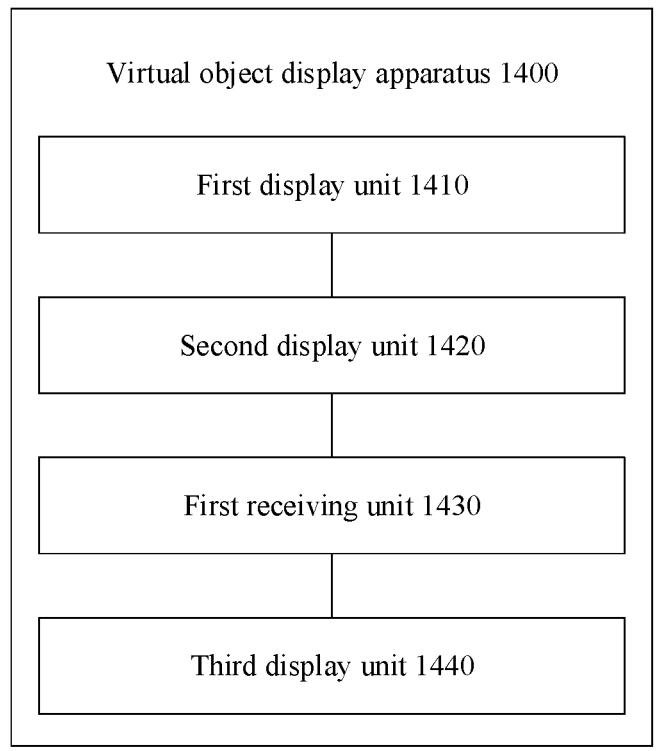
FIG. 14 is a schematic structural diagram of an apparatus for displaying a virtual object according to an embodiment of the present disclosure.

FIG. 14 shows a schematic structural diagram of an apparatus for displaying a virtual object according to an embodiment of the present disclosure.

In an embodiment of the present disclosure, the apparatus 400 for displaying a virtual object shown in FIG. 14 may be provided in an electronic device. In some embodiments, the electronic device may be the first electronic device 101 in the client shown in FIG. 1. In other embodiments, alternatively, the electronic device may be the second electronic device 102 shown in FIG. 1, which is not limited herein. The electronic device may be a mobile phone, a tablet computer, a desktop computer, a notebook computer, a vehicle-mounted terminal, a wearable device, an all-in-one computer, a smart home device, or other device with communication functions, or a device simulated by a virtual machine or a simulator.

As shown in FIG. 14, the apparatus 400 for displaying a virtual object may include a first display unit 1410, a second display unit 1420, a first receiving unit 1430 and a third display unit 1440.

The first display unit 1410 may be configured to display an object model of the virtual object and at least one preset control, where the object model includes part models of parts of the virtual object, and each of the at least one preset control is used to indicate a control mode.

The second display unit 1420 may be configured to: in response to detecting a first trigger operation performed on a first preset control in the at least one preset control, display the first preset control in a first display state, where the first display state is used to indicate a control mode indicated by a corresponding preset control being in an ON state.

The first receiving unit 1430 may be configured to: in a case that a first control mode indicated by the first preset control is in the ON state, receive first control information targeted for a target part of the virtual object.

The third display unit 1440 may be configured to replace a part model of the target part with a target model corresponding to the first control information for display.

In the embodiment of the present disclosure, at least one preset control can be displayed, so that the user can select a desired control mode from control modes indicated by the at least one preset control. In a case that the first trigger operation performed by the user on the first preset control corresponding to the selected control model is detected, the first preset control can be displayed in the first display state, and the first control mode indicated by the first preset control can be controlled to be in the ON state, so that the first control information targeted for the target part of the virtual object can be received in a case that the first control mode is in the ON state, and the part model of the target part is replaced with the target model corresponding to the first control information for display. In this way, the electronic device can perform personalized adjustment on the object model of the virtual object based on the first control information, so that the user can flexibly control the virtual object according to his own needs, thereby improving the user experience.

In some embodiments of the present disclosure, the apparatus 400 for displaying a virtual object may further include a fourth display unit, and the fourth display unit may be configured to switch a second preset control in the at least one preset control from the first display state to a second display state, where the second display state is used to indicate a control mode indicated by a corresponding preset control being in an OFF state, and a second control mode indicated by the second preset control is prohibited from being in the ON state when the first control mode is in the ON state.

In some embodiments of the present disclosure, the apparatus 400 for displaying a virtual object may further include a fifth display unit, and the fifth display unit may be configured to maintain a third preset control in the at least one preset control in the first display state, where a third control mode indicated by the third preset control is allowed to be in the ON state when the first control mode is in the ON state.

In some embodiments of the present disclosure, the first control mode may include a decoration mode.

Correspondingly, the first receiving unit 1430 may include a first receiving sub-unit and a first processing sub-unit.

The first receiving sub-unit may be configured to receive an image changing operation targeted for the target part of the virtual object, where the image changing operation is used to select a target decoration to be worn on the target part The first processing sub-unit may be configured to use the target decoration selected by the image changing operation as the first control information targeted for the target part of the virtual object.

Further, the target model may include a target decoration model of the target decoration.

Optionally, the target decoration may include at least one of: a face decoration, a head decoration and a clothing decoration.

In other embodiments of the present disclosure, the first control mode may include an action following mode.

Correspondingly, the first receiving unit 1430 may include a second receiving sub-unit and a second processing sub-unit.

The second receiving sub-unit may be configured to receive a real-time posture image.

The second processing sub-unit may be configured to use a target posture of the target part in the real-time posture image as the first control information targeted for the target part of the virtual object.

Further, the target model may include a target posture model of the target posture.

Optionally, the apparatus 400 for displaying a virtual object may further include a sixth display unit, and the sixth display unit may be configured to display the real-time posture image in a target display area.

Optionally, the target part may include any one of:
a head part, a local body part, and a whole body part.

Optionally, the apparatus 400 for displaying a virtual object may further include a first extraction unit and a first processing unit.

The first extraction unit may be configured to extract a human biological feature in the real-time posture image.

The first processing unit may be configured to compare the human biological feature with a target biological feature, where the target biological feature includes a biological feature of the virtual object.

Correspondingly, the third display unit 1440 may be further configured to: in a case that the human biological feature is the same as the target biological feature, replace the part model of the target part with the target model for display.

In yet other embodiments of the present disclosure, the first control mode may include a broadcast mode.

Correspondingly, the first receiving unit 1430 may include a third receiving sub-unit and a third processing sub-unit.

The third receiving sub-unit may be configured to receive a broadcast text input operation, where the broadcast text input operation is used to input target text;

The third processing sub-unit may be configured to use the target text as the first control information targeted for the target part of the virtual object;

Further, the target part includes a head part, and the target model includes a model of the head part which is broadcasting the target text.

Optionally, the apparatus 400 for displaying a virtual object may further include an attribute obtaining unit, a model selection unit, a speech conversion unit and a model generation unit.

The attribute obtaining unit may be configured to obtain a decoration attribute of the virtual object.

The model selection unit may be configured to select, from multiple preset text-to-speech conversion models, a target text-to-speech conversion model corresponding to the decoration attribute.

The speech conversion unit may be configured to input the target text into the target text-to-speech conversion model for speech conversion to obtain a target audio.

The model generation unit may be configured to generate the target model based on the target audio.

In some embodiment of the present disclosure, the apparatus 400 for displaying a virtual object may further include an image capturing unit, a second extraction unit, a second processing unit and an operation detection unit.

The image capturing unit may be configured to capture a user image.

The second extraction unit may be configured to extract a user biological feature in the user image.

The second extraction unit may be configured to compare the user biological feature with a target biological feature, where the target biological feature includes a biological feature of the virtual object.

The operation detection unit may be configured to detect the first trigger operation in a case that the user biological feature is the same as the biological feature of the virtual object.

In some embodiment of the present disclosure, the apparatus 400 for displaying a virtual object may further include a seventh display unit. The seventh display unit may be configured to: in a case that the user biological feature is different from the biological feature of the virtual object, display the at least one preset control in a third display state, where the third display state is used to indicate the at least one preset control being in an inoperable state.

It should be noted that, the apparatus 400 for displaying a virtual object shown in FIG. 14 can perform steps in the method embodiments shown in FIGS. 2 to 13, and implement processes and effects in the method embodiments shown in FIGS. 2 to 13, which are not repeated here.

An electronic device is further provided according to an embodiment of the present disclosure, the electronic device may include a processor and a memory. The memory may be configured to store executable instructions. The processor may be configured to read the executable instructions from the memory, and execute the executable instructions to implement the method for displaying a virtual object according to the foregoing embodiments.

Figure 15:
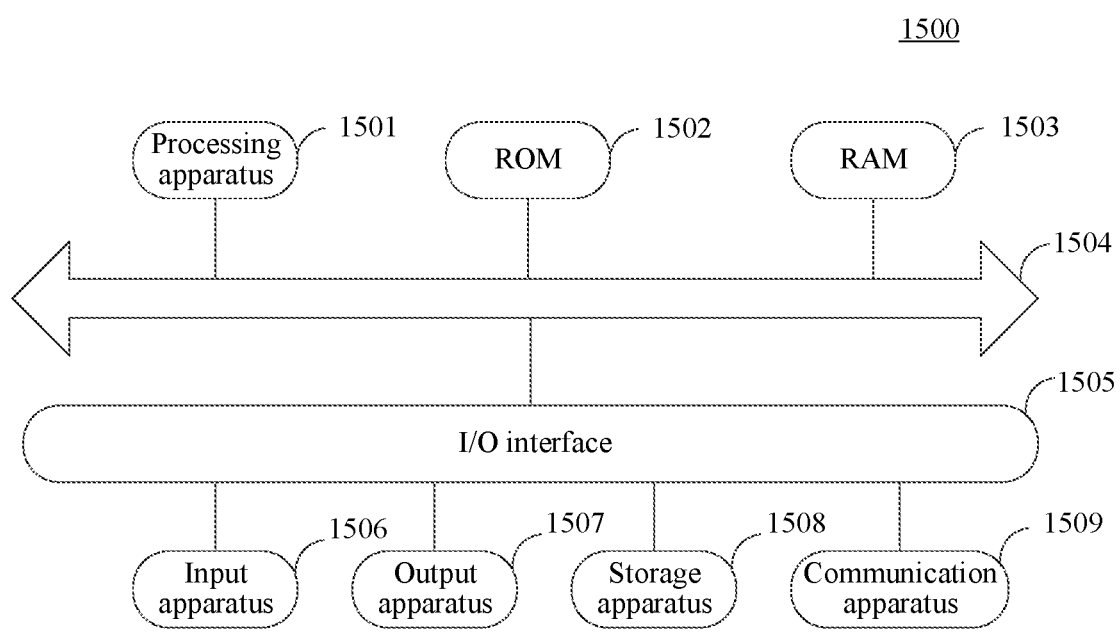
FIG. 15 is a schematic structural diagram of an electronic device according to an embodiment of the present disclosure.

FIG. 15 shows a schematic structural diagram of an electronic device according to an embodiment of the present disclosure. Referring specifically to FIG. 15 hereinafter, FIG. 15 shows a schematic structural diagram of an electronic device 1500 suitable for implementing an embodiment of the present disclosure.

The electronic device 1500 according to the embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), a vehicle-mounted terminal (for example, a vehicle-mounted navigation terminal), a wearable device, and stationary terminals such as a digital TV, a desktop computer, and a smart home device.

In some embodiments, the electronic device 1500 may be the first electronic device 101 in the client shown in FIG. 1. In other embodiments, alternatively, the electronic device 1500 may be the second electronic device 102 shown in FIG. 1, which is not limited herein.

It should be noted that the electronic device 1500 shown in FIG. 15 is only an example, and should not impose any limitations on the functions and scope of use of the embodiments of the present disclosure.

As shown in FIG. 15, the electronic device 1500 may include a processing apparatus (such as a central processor and a graphic processor) 1501. The processing apparatus may perform various appropriate actions and processing based on programs stored in a read-only memory (ROM) 1502 or programs uploaded from a storage apparatus 1508 to a random access memory (RAM) 1503. Various programs and data required for operations of the electronic device 1500 are also stored in the RAM 1503. The processing apparatus 1501, the ROM 1502 and the RAM 1503 are connected to each other through the bus 1504. An input/output (I/O) interface 1505 is also connected to the bus 1504.

Generally, the following apparatuses may be connected to the I/O interface 1505: an input apparatus 1506 such as a touch screen, a touch panel, a keyboard, a mouse, a camera, a microphone, an accelerometer, and gyroscope; an output apparatus 1507 such as a liquid crystal display (LCD), a loudspeaker and a vibrator; a storage apparatus 1508 such as a magnetic tape and a hard disk; and a communication apparatus 1509. The communication apparatus 1509 may allow the electronic device 1500 to communicate with other device in a wired or wireless manner to exchange data. Although FIG. 15 shows the electronic device 1500 provided with various apparatuses, it should be understood that not all shown apparatuses are required to be implemented or included. Alternatively, more or less apparatuses may be implemented or included.

A computer storage medium having a computer program stored thereon is further provided according to an embodiment of the present disclosure. The computer program, when being executed by a processor, causes the processor to implement the method for displaying a virtual object according to the foregoing embodiments.

Particularly, according to the embodiments of the present disclosure, the process described above in conjunction with flowcharts may be implemented as a computer software program. For example, a computer program product is further provided according to an embodiment of the present disclosure, including a computer program carried on a non-transitory computer readable medium. The computer program includes program code for performing the method shown in the flowchart. In the embodiment, the computer program may be downloaded and installed from the network via the communication apparatus 1509, or installed from the storage apparatus 1508, or installed from the ROM 1502. When the computer program is executed by the processing apparatus 1501, the functions defined in the method for displaying a virtual object according to the embodiment of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The computer readable storage medium may be included in the electronic device, or may stand alone without being assembled into the electronic device.

The computer readable medium carries one or more programs. The one or more programs, when executed by the electronic device, enable the electronic device to perform the following operations:

displaying an object model of the virtual object and at least one preset control, where the object model includes part models of parts of the virtual object, and each of the at least one preset control is used to indicate a control mode; in response to detecting a first trigger operation performed on a first preset control in the at least one preset control, displaying the first preset control in a first display state, where the first display state is used to indicate a control mode indicated by a corresponding preset control being in the ON state; in a case that a first control mode indicated by the first preset control is in the ON state, receiving first control information targeted for a target part of the virtual object; and replacing a part model of the target part with a target model corresponding to the first control information for display.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. Conversely, the specific features and actions described above are merely example forms of implementing the claims.

The invention claimed is:

1. A method for displaying a virtual object, comprising:
displaying an object model of the virtual object and at least one preset control, wherein the object model comprises part models of parts of the virtual object, and each of the at least one preset control is used to indicate a control mode;
in response to detecting a first trigger operation performed on a first preset control in the at least one preset control, displaying the first preset control in a first display state, wherein the first display state is used to indicate a control mode indicated by a corresponding preset control being in an ON state;

in a case that a first control mode indicated by the first preset control is in the ON state, receiving first control information targeted for a target part of the virtual object; and replacing a part model of the target part with a target model corresponding to the first control information for display, wherein before the first trigger operation performed on the first preset control in the at least one preset control is detected, the method further comprises:

capturing a user image;

extracting a user biological feature in the user image;

comparing the user biological feature with a target biological feature, wherein the target biological feature comprises a biological feature of the virtual object; and detecting the first trigger operation in a case that the user biological feature is the same as the biological feature of the virtual object.

2. The method according to claim 1, wherein after the first trigger operation performed on the first preset control in the at least one preset control is detected, the method further comprises:

switching a second preset control in the at least one preset control from the first display state to a second display state, wherein the second display state is used to indicate a control mode indicated by a corresponding preset control being in an OFF state, and a second control mode indicated by the second preset control is prohibited from being in the ON state when the first control mode is in the ON state.

3. The method according to claim 1, wherein after the first trigger operation performed on the first preset control in the at least one preset control is detected, the method further comprises:

maintaining a second preset control in the at least one preset control in the first display state, wherein a second control mode indicated by the second preset control is allowed to be in the ON state when the first control mode is in the ON state.

4. The method according to claim 1, wherein the first control mode comprises a decoration mode;

wherein the receiving first control information targeted for the target part of the virtual object comprises:

receiving an image changing operation targeted for the target part, wherein the image changing operation is used to select a target decoration to be worn on the target part; and using the target decoration selected by the image changing operation as the first control information targeted for the target part of the virtual object;

wherein the target model comprises a target decoration model of the target decoration.

5. The method according to claim 4, wherein the target decoration comprises at least one of:

a face decoration, a head decoration and a clothing decoration.

6. The method according to claim 1, wherein the first control mode comprises an action following mode;

wherein the receiving first control information targeted for the target part of the virtual object comprises:

receiving a real-time posture image; and using a target posture of the target part in the real-time posture image as the first control information targeted for the target part of the virtual object;

wherein the target model comprises a target posture model of the target posture.

7. The method according to claim 6, wherein the method further comprises:

displaying the real-time posture image in a target display area.

8. The method according to claim 6, wherein the target part comprises any one of:

a head part, a local body part, and a whole body part.

9. The method according to claim 6, wherein before replacing the part model of the target part with the target model corresponding to the first control information for display, the method further comprises:

extracting a human biological feature in the real-time posture image; and comparing the human biological feature with a target biological feature, wherein the target biological feature comprises a biological feature of the virtual object;

wherein the replacing the part model of the target part with the target model corresponding to the first control information for display comprises:

in a case that the human biological feature is the same as the target biological feature, replacing the part model of the target part with the target model for display.

10. The method according to claim 1, wherein the first control mode comprises a broadcast mode;

wherein the receiving first control information targeted for the target part of the virtual object comprises:

receiving a broadcast text input operation, wherein the broadcast text input operation is used to input target text; and using the target text as the first control information targeted for the target part of the virtual object;

wherein the target part comprises a head part, and the target model comprises a model of the head part which is broadcasting the target text.

11. The method according to claim 10, wherein after using the target text as the first control information, and before replacing the part model of the target part with the target model corresponding to the first control information for display, the method further comprises:

obtaining a decoration attribute of the virtual object;

selecting, from a plurality of preset text-to-speech conversion models, a target text-to-speech conversion model corresponding to the decoration attribute;

inputting the target text into the target text-to-speech conversion model for speech conversion to obtain a target audio; and generating the target model based on the target audio.

12. The method according to claim 1, wherein after comparing the user biological feature with the target biological feature, the method further comprises:

in a case that the user biological feature is different from the biological feature of the virtual object, displaying the at least one preset control in a preset display state, wherein the preset display state is used to indicate the at least one preset control being in an inoperable state.

13. An electronic device, comprising:

a processor; and a memory configured to store executable instructions;

wherein the processor is configured to read the executable instructions from the memory, and execute the executable instructions to implement;

displaying an object model of a virtual object and at least one preset control, wherein the object model comprises part models of parts of the virtual object, and each of the at least one preset control is used to indicate a control mode;

in response to detecting a first trigger operation performed on a first preset control in the at least one preset control, displaying the first preset control in a first display state, wherein the first display state is used to indicate a control mode indicated by a corresponding preset control being in an ON state;

in a case that a first control mode indicated by the first preset control is in the ON state, receiving first control information targeted for a target part of the virtual object; and replacing a part model of the target part with a target model corresponding to the first control information for display, wherein before the first trigger operation performed on the first preset control in the at least one preset control is detected, the processor is further configured to implement:

capturing a user image;

extracting a user biological feature in the user image;

comparing the user biological feature with a target biological feature, wherein the target biological feature comprises a biological feature of the virtual object; and detecting the first trigger operation in a case that the user biological feature is the same as the biological feature of the virtual object.

14. The electronic device according to claim 13, wherein the processor is further configured to implement:

switching a second preset control in the at least one preset control from the first display state to a second display state, wherein the second display state is used to indicate a control mode indicated by a corresponding preset control being in an OFF state, and a second control mode indicated by the second preset control is prohibited from being in the ON state when the first control mode is in the ON state.

15. The electronic device according to claim 13, wherein the processor is further configured to implement:

maintaining a second preset control in the at least one preset control in the first display state, wherein a second control mode indicated by the second preset control is allowed to be in the ON state when the first control mode is in the ON state.

16. The electronic device according to claim 13, wherein the first control mode comprises a decoration mode;

wherein the processor is further configured to implement:

receiving an image changing operation targeted for the target part, wherein the image changing operation is used to select a target decoration to be worn on the target part; and using the target decoration selected by the image changing operation as the first control information targeted for the target part of the virtual object;

wherein the target model comprises a target decoration model of the target decoration.

17. The electronic device according to claim 16, wherein the target decoration comprises at least one of:

a face decoration, a head decoration and a clothing decoration.

18. The electronic device according to claim 13, wherein the first control mode comprises an action following mode;

wherein the processor is further configured to implement:

receiving a real-time posture image; and using a target posture of the target part in the real-time posture image as the first control information targeted for the target part of the virtual object;

wherein the target model comprises a target posture model of the target posture.

19. A non-transitory computer-readable storage medium having a computer program stored thereon, wherein the computer program, when being executed by a processor, causes the processor to implement:

displaying an object model of a virtual object and at least one preset control, wherein the object model comprises part models of parts of the virtual object, and each of the at least one preset control is used to indicate a control mode;

in response to detecting a first trigger operation performed on a first preset control in the at least one preset control, displaying the first preset control in a first display state, wherein the first display state is used to indicate a control mode indicated by a corresponding preset control being in an ON state;

in a case that a first control mode indicated by the first preset control is in the ON state, receiving first control information targeted for a target part of the virtual object; and replacing a part model of the target part with a target model corresponding to the first control information for display, wherein before the first trigger operation performed on the first preset control in the at least one preset control is detected, the processor is further caused to implement:

capturing a user image;

extracting a user biological feature in the user image;

comparing the user biological feature with a target biological feature, wherein the target biological feature comprises a biological feature of the virtual object; and detecting the first trigger operation in a case that the user biological feature is the same as the biological feature of the virtual object.

* * * * *